(12) United States Patent
White

(10) Patent No.: US 7,821,739 B2
(45) Date of Patent: Oct. 26, 2010

(54) ASYMMETRIC OPPOSED SLIDER AIR BEARINGS FOR HIGH SPEED RECORDING ON A METAL FOIL DISK

(75) Inventor: James White, Knoxville, TN (US)

(73) Assignee: Antek Peripherals, Inc., Saratoga, CA (US)

( * ) Notice: Subject to any disclaimer, the term of this patent is extended or adjusted under 35 U.S.C. 154(b) by 834 days.

(21) Appl. No.: 11/748,417

(22) Filed: May 14, 2007

(65) Prior Publication Data

US 2007/0279804 A1 Dec. 6, 2007

Related U.S. Application Data

(60) Provisional application No. 60/803,696, filed on Jun. 1, 2006.

(51) Int. Cl.
G11B 5/55 (2006.01)
(52) U.S. Cl. .................................. 360/246.8; 360/234.2
(58) Field of Classification Search .............. 360/234.2, 360/246.2, 246.8
See application file for complete search history.

(56) References Cited

U.S. PATENT DOCUMENTS

| 4,214,287 | A | * | 7/1980 | Stromsta et al. .......... 360/234.2 |
| 4,673,996 | A |   | 6/1987 | White |
| 4,811,143 | A | * | 3/1989 | Ohashi et al. ............ 360/246.8 |
| 4,870,519 | A |   | 9/1989 | White |
| 4,974,106 | A |   | 11/1990 | White |
| 5,377,060 | A |   | 12/1994 | Nigam |
| 5,404,256 | A |   | 4/1995 | White |

(Continued)

OTHER PUBLICATIONS

White, J.W., *Slider Air Bearing Design Enhancements for High Speed Flexible Disk Recording*, Journal of Tribology, vol. 127, pp. 522-529, Jul. 2005.

(Continued)

*Primary Examiner*—A. J. Heinz
(74) *Attorney, Agent, or Firm*—Townsend and Townsend and Crew LLP

(57) ABSTRACT

A metal foil disk offers some of the best characteristics of both the hard disk and floppy disk for digital data storage. One embodiment uses an opposed slider air bearing arrangement that provides advantages when used with a high speed metal foil disk in either a fixed or removable format. Use is made of the fact that the opposing sliders interact through their influence on the flexible disk that is sandwiched between them. Asymmetry of opposing air bearings may be created by etching the air bearing pad opposite the recording element pad to a depth sufficient that the flying height and air film stiffness of the opposing pad reach desired levels. The result is an air bearing interface with low flying height and high stiffness over the recording element opposed by a high flying height and low stiffness on the other side of the disk. This air bearing interface provides an enhanced dynamic flexibility to the metal foil disk when it is subjected to mechanical shock. As a result, the opposed slider arrangement with metal foil disk is able to avoid contact and impact when subjected to substantial levels of mechanical shock. Thus, wear and damage to slider and disk surfaces are reduced as well as the possibility of lost recorded data. This makes the metal foil disk a strong candidate as a rotating storage medium for mobile and portable applications where a shock environment is common.

21 Claims, 21 Drawing Sheets

U.S. PATENT DOCUMENTS

| | | | |
|---|---|---|---|
| 4,673,996 | A | 2/1997 | White |
| 5,636,085 | A | 6/1997 | Jones |
| 5,726,831 | A | 3/1998 | White |
| 5,968,627 | A | 10/1999 | Nigam |
| 6,023,393 | A | 2/2000 | White |
| 6,113,753 | A | 9/2000 | Washburn |
| 6,115,219 | A | 9/2000 | Hall |
| 6,222,703 | B1 * | 4/2001 | Osaka et al. ............. 360/236.8 |
| 6,243,232 | B1 | 6/2001 | Osaka |
| 6,297,937 | B1 | 10/2001 | Schar |
| 6,359,753 | B1 | 3/2002 | Osaka |
| 6,487,049 | B1 | 11/2002 | Hall |
| 6,496,332 | B1 | 12/2002 | Okazaki |
| 6,580,584 | B2 | 6/2003 | Hall |
| 6,583,959 | B1 | 6/2003 | Hall |
| 6,947,257 | B2 | 9/2005 | Hall |
| 6,954,339 | B2 | 10/2005 | Bement et al. |
| 7,064,931 | B2 | 6/2006 | Hutchinson |
| 2002/0003682 | A1 * | 1/2002 | Kakuno ................... 360/246.2 |

OTHER PUBLICATIONS

White, J.W., *A Uniform Flying Height Rotary Actuated Air Bearing Slider*, presented International Magnetics Conference, Apr. 1986, Phoenix, Arizona, also published IEEE Transaction. Magnetics, Mag-22, No. 5, pp. 1028-1030, Sep. 1986.

White, J.W., *An Air Bearing Slider With Uniform Flying Height and Fast Take-Off Characteristics*, presented 1986 ASME/ASLE Tribology Conference, Pittsburgh, PA, *also published ASLE Tribology and Mechanics of Magnetic Storage Systems, SP-21*, pp. 96-101, (Aug. 2007).

White, J.W., *Dynamic Response of the Transverse Pressure Contour Slider*, Department of Mechanical Engineering and Institute for Information Storage Technology, Santa Clara University, pp. 72-82. (Aug. 2007).

White, J.W., *Flying Characteristics of the Transverse and Negative Pressure Contour("TNP") Slider Air Bearing*, contributed to The American Society of Mechanical Engineers for presentation at the ASME/STLE Joint Tribology Conference, San Francisco, CA., Oct. 13-17, 1996.

White, J.W., et al., *A Factored Implicit Scheme for the Numerical Solution of the Reynolds Equation at Very Low Spacing*, Journal of Lubrication Technology, vol. 102, Jan. 1980.

White, J.W., *A Study of Low Flying Height Heads for Stretched Surface Recording*, Tribology and Mechanics of Magnetic storage Systems, vol. IV. (Aug. 2007).

Benson. R.C., et al., *Deflection of a Very Flexible Spinning Disk Due to a Stationary Transverse Load*, Transactions of the ASME, vol. 45, Sep. 1978.

Adams, G.G., *Procedures for the Study of the Flexible-Disk to Head Interface*, IBM J. Res. Develop., vol. 24, No. 4, Jul. 1980.

Wu, R.Y., et al., *The Effect of Disk Warpage/Skew on the Deflection and Vibration of a Flexible Disk Spinning Above a Baseplate and in Contact with a Point-Head*, Transactions of the ASME, vol. 119, Jan. 1997.

* cited by examiner

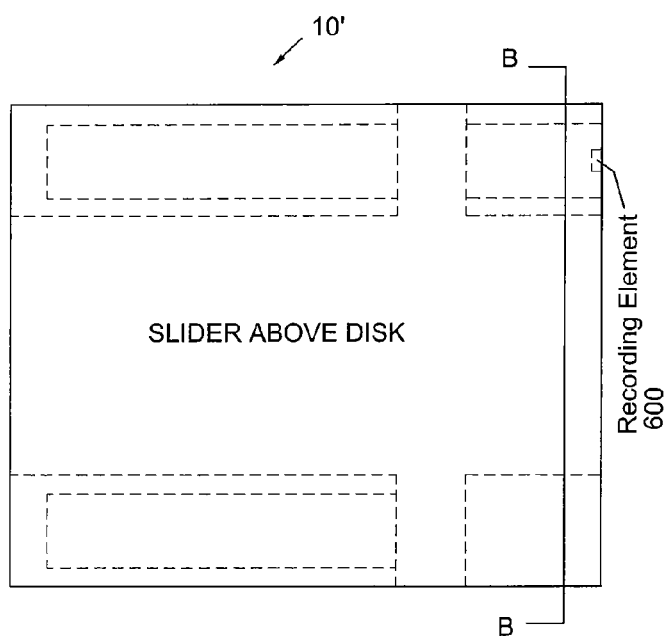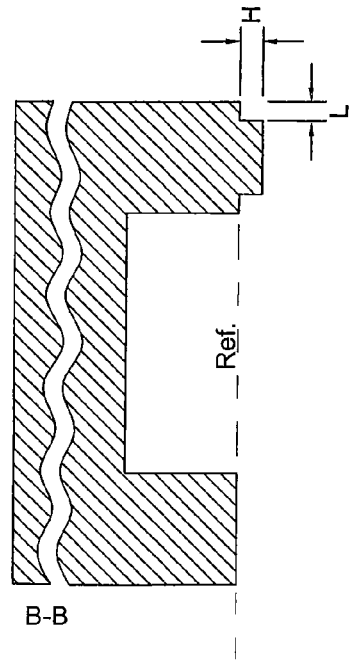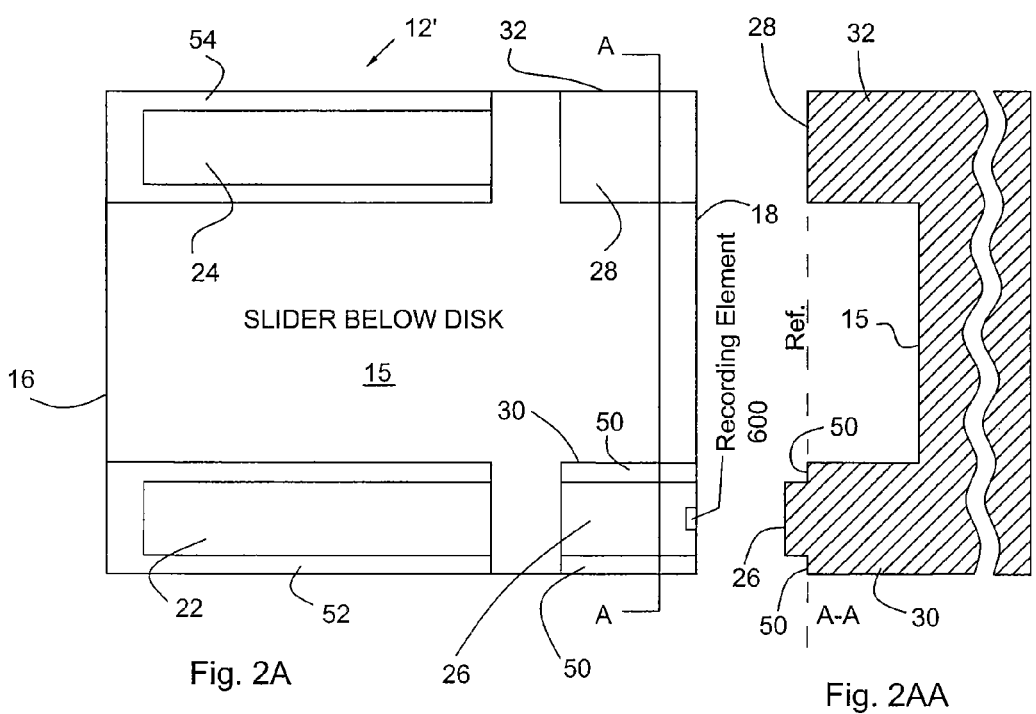

ASYMMETRIC OPPOSED SLIDER AIR BEARINGS FOR HIGH SPEED RECORDING ON A METAL FOIL DISK

CROSS REFERENCES TO RELATED APPLICATIONS

This application is a continuation in part application and claims the benefit of U.S. Provisional Patent Application No. 60/803,696, filed Jun. 1, 2006, the complete disclosure of which is herein incorporated by reference.

BACKGROUND OF THE INVENTION

The floppy disk drive typically operates at low rotational speeds and utilizes a recording medium that is removable and interchangeable with other similar devices. The floppy disk is less expensive and more rugged than the hard disk. However, the floppy disk has severe limitations with regard to possible data densities. The floppy disk is composed of a plastic substrate, such as Mylar or polyethylene terephthalate, that is coated with a slurry of magnetic particles. This coating cannot support the high areal densities of magnetic recording possible with the thin sputter deposited films of the hard disk. And the plastic substrate of the floppy disk cannot survive the high temperatures required by the sputter deposition used for the hard disk. Also, the plastic substrate of the floppy disk exhibits anisotropic properties which further limit the storage densities possible. Other techniques, such as vapor deposition and low temperature sputtering, have been used with the plastic substrate. However, the magnetic characteristics obtained do not approach those of the hard disk.

Disk drive data storage devices are becoming more portable and mobile with increased emphasis on storage capacity, speed of data transfer, shock resistance, and reduced power consumption. With motivation toward these goals, White, J., 2005, "Slider Air Bearing Design Enhancements for High Speed Flexible Disk Recording," ASME *Journal of Tribology*, 127, pp. 522-529 described the performance of an asymmetric longitudinally slotted rail opposed magnetic head slider arrangement for use with a high speed flexible Mylar disk. The complete disclosure of this reference is herein incorporated by reference. In that work, the disk thickness was 63.5 μm (0.0025 in), and the slider was of the industry standard nano configuration (2.00 mm×1.60 mm footprint). The static flexibility of the disk was utilized to shape and deflect the disk at the sub-micron level over the slider air bearing surface (ABS). This allows the minimum fly height to be focused on the recording element (RE), with higher fly heights elsewhere, tending to minimize contact between slider and disk. This slider and disk arrangement also provides for improved slider/disk response to mechanical shock by using the disk static flexibility to position the thin and stiff air film at the RE opposite a much thicker and less stiff air film on the other side of the disk.

A storage medium alternative that combines some of the best features of both the hard disk and the floppy disk is the metal foil disk described by Nigam, A., and White, J. W., 1999, "Metal Foil Disk for High Areal Density Recording in Environments of High Mechanical Shock," U.S. Pat. No. 5,968,627, incorporated herein by reference. This disk makes use of a thin metal substrate with isotropic properties together with recording layers typical of a hard disk. It requires less operational energy than a hard disk while providing storage densities and data transfer rates typical of the hard disk. In addition, the metal foil disk, due to its flexibility, offers increased mechanical shock resistance as compared to a hard disk. And manufacturing cost of the metal foil disk promises to be less than that of the hard disk due to decreased material cost and process advantages. (See Nigam, A., and White, J. W., 1999, "Metal Foil Disk for High Areal Density Recording in Environments of High Mechanical Shock," U.S. Pat. No. 5,968,627 and Washburn, H., 2000, "Systems and Methods for Making a Magnetic Recording Medium on a Flexible Metal Substrate," U.S. Pat. No. 6,113,753, incorporated herein by reference).

BRIEF SUMMARY OF THE INVENTION

In one embodiment, the invention includes a slider arrangement for supporting a recording element in operative relation to a flexible moving recording medium. The slider arrangement includes a first slider having a first face positioned toward a first side of the recording medium. The first face contains a plurality of air bearing surfaces, including an air bearing surface A. Also, the first face has a leading edge, a trailing edge and two side edges relative to the motion of the recording medium. The first face further includes a longitudinal axis disposed along its length that is disposed at a non-zero skew angle with respect to the direction of motion of the recording medium. Also, a recording element is mounted in surface A and located in the vicinity of the trailing edge of the first face. For convenience of discussion, at least a portion of one of the air bearing surfaces which is unetched may define an unetched plane.

The slider arrangement further includes a second slider having a second face positioned toward a second side of the recording medium. The second face has a plurality of air bearing surfaces, including an air bearing surface B. The second face has a leading edge, a trailing edge and two side edges relative to the motion of the recording medium. The second face further includes a longitudinal axis disposed along its length that is disposed at a non-zero skew angle with respect to the direction of motion of the recording medium. Also, at least a portion of surface B is carried in the vicinity of the trailing edge of the second face. For convenience of discussion, at least a portion of one of the air bearing surfaces which is unetched may define an unetched plane.

A first mounting device is employed to mount the first slider relative to the first side of the recording medium substantially opposite the second slider in a biased manner toward the recording medium. A second mounting device is used to mount the second slider relative to the second side of the recording medium substantially opposite the first slider in a biased manner toward the recording medium. Further, surface A is located in such a way that the recording element is directly opposite a portion of surface B.

In one aspect, the flexible recording medium comprises a metallic substrate and at least one layer of magnetic material such that the thickness of the flexible recording medium is less than about 0.005 inch. Also, in the vicinity of the recording element, surface B has a depth greater than that of surface A relative to their respective unetched planes. In other words, the etch depth of surface B relative to its unetched plane is greater than the etch depth of surface A relative to its unetched plane. This may be the case even if surface A is unetched. In this way, during operation, the flying height at the recording element is less than the thickness of a directly opposing air film of surface B.

In some cases, the air bearing surface A and the air bearing surface B are formed by etching. In one particular arrangement, at least one of the air bearing surfaces carried by the first face is provided with a transverse pressure contour (TPC) along at least one of its side edges for providing increased flying height control to first slider. This TPC may have at least an approximate step geometry produced using an etching process. The TPC has a height H and width L to establish a ratio H/L of about 0.001 to about 0.10. Also, the TPC may have a length that occupies at least a partial length of the air bearing surface side edge of its location, a width L that may vary along its length, and a height H that may vary along its length.

In one particular arrangement, the TPC occupies the full length of the air bearing surface side edge of its location. However, in other cases, the TPC may extend along a partial length. Also, in some cases, the width L is constant along its length, and the height H is constant along its length. In other situations, these dimension may be variable.

In a further embodiment, the invention provides a slider arrangement for supporting a recording element in operative relation to a flexible moving recording medium. The slider arrangement comprises a first slider having a first face positioned toward a first side of the recording medium. The first face contains a plurality of air bearing surfaces, including an air bearing surface A and an air bearing surface B. At least a portion of one of these surfaces may be unetched and define an unetched plane. The first face also has a leading edge, a trailing edge and two side edges relative to the motion of the recording medium. The first face further includes a longitudinal axis disposed along its length. The longitudinal axis is at a non-zero skew angle with respect to the direction of motion of said recording medium. Also, a first recording element is mounted in surface A and is located in the vicinity of the trailing edge of the first face. At least a portion of surface B is located in the vicinity of the trailing edge of the first face.

The slider arrangement also includes a second slider having a second face positioned toward a second side of the recording medium. The second face contains a plurality of air bearing surfaces, including an air bearing surface C and an air bearing surface D. At least a portion of one of these surfaces may be unetched and define an unetched plane. The second face has a leading edge, a trailing edge and two side edges relative to the motion of the recording medium, along with a longitudinal axis disposed along its length. The longitudinal axis is disposed at a non-zero skew angle with respect to the direction of motion of the recording medium. A second recording element is mounted in surface C and is located in the vicinity of the trailing edge of the second face. Also, at least a portion of surface D is carried in the vicinity of the trailing edge of the second face.

A first mounting device is employed to mount the first slider relative to the first side of the recording medium substantially opposite the second slider in a biased manner toward the recording medium. A second mounting device is employed to mount the second slider relative to the second side of the recording medium substantially opposite the first slider in a biased manner toward the recording medium. Further, surface A is located in such a way that the first recording element is directly opposite a portion of surface D, and surface C is located in such a way that the second recording element is directly opposite a portion of surface B. The flexible recording medium may comprise a metallic substrate and at least one layer of magnetic material such that the thickness of the flexible recording medium is less than about 0.005 inch. Also, in the vicinity of the first recording element, surface D has a depth greater than that of surface A relative to their respective unetched planes, and in the vicinity of the second recording element, surface B has a depth greater than that of surface C relative to their respective unetched planes. In this way, during operation the flying height at each said recording element is less than the thickness of a directly opposing respective air film.

In one particular arrangement, the air bearing surfaces A, B, C and D are formed by etching. In a further aspect, at least one of the air bearing surfaces carried by the first face is provided with a transverse pressure contour (TPC) along at least one of its side edges for providing increased flying height control to first slider. The TPC has at least an approximate step geometry provided by an etching process. For purposes of discussion, the TPC may have a height H and width L to establish a ratio H/L of about 0.001 to about 0.10. Also, the TPC may have a length that occupies at least a partial length of the air bearing surface side edge of its location, a width L that may vary along its length, and a height H that may vary along its length.

In one aspect, the TPC may occupy either the full length of a partial length of the side edge of its air bearing surface. Also, the width L the height H may be constant or variable along their lengths.

In another aspect, the recording medium substrate may be constructed of a variety of materials, such as steel, stainless steel, nickel, nickel alloys, titanium, titanium alloys and the like. Also, the thickness of the flexible recording medium may be less than about 0.003 inch.

In yet another embodiment, the invention provides a slider arrangement for supporting a recording element in operative relation to a flexible moving recording medium. The slider arrangement comprises a first slider having a first face positioned toward a first side of the recording medium. The first face contains a plurality of air bearing surfaces, including an air bearing surface A and an air bearing surface B that may be formed by etching. The first face has a leading edge, a trailing edge and two side edges relative to the motion of the recording medium. A longitudinal axis is disposed along the length of the first face and is disposed at a non-zero skew angle with respect to the direction of motion of the recording medium. A first recording element is mounted in surface A and is located in the vicinity of the trailing edge of the first face. At least a portion of surface B is located in the vicinity of the trailing edge of the first face.

At least one air bearing surface carried by the first face is provided with a transverse pressure contour (TPC) along at least one of its side edges for providing increased flying height control to first slider. The TPC has a step or approximate step geometry provided by an etching process and has a height H and width L to establish a ratio H/L of about 0.001 to about 0.10. The TPC has a length that occupies at least a partial length of the air bearing surface side edge of its location. The width L may vary along its length, and the height H may vary along its length. A second slider has a second face positioned toward a second side of the recording medium. The second face contains a plurality of air bearing surfaces, including an air bearing surface C and an air bearing surface D that may be formed by etching. The second face has a leading edge, a trailing edge and two side edges relative to the motion of said recording medium. A longitudinal axis is disposed along the length of the second face and is disposed at a non-zero skew angle with respect to the direction of motion of the recording medium. A second recording element is mounted in surface C and is located in the vicinity of the trailing edge of the second face. At least a portion of surface D is carried in the vicinity of the trailing edge of the second face.

A first mounting device is employed to mount the first slider relative to the first side of the recording medium substantially opposite the second slider in a biased manner toward the recording medium. A second mounting device is employed to mount the second slider relative to the second side of the recording medium substantially opposite the first slider in a biased manner toward the recording medium. Surface A is located in such a way that the first recording element is directly opposite a portion of surface D, and surface C is located in such a way that the second recording element is directly opposite a portion of surface B.

The flexible recording medium comprises a metallic substrate and at least one layer of magnetic material such that the thickness of the flexible recording medium is less than about 0.005 inch. At least a portion of surface D is etched to a depth greater than that of surface A (relative to their respective unetched planes) in the vicinity of the first recording element, and at least a portion of surface B is etched to a depth greater than that of surface C (relative to their respective unetched planes) in the vicinity of the second recording element. During operation, the flying height at each said recording element is less than the thickness of the directly opposing respective air film.

In some cases, the TPC occupies the full length of the side edge of the first or second air bearing surface, although it could occupy only a partial length. Also, the width L varies along its length, and the height H varies along its length, although in some cases these dimensions may be constant.

BRIEF DESCRIPTION OF THE DRAWINGS

FIG. 2A illustrates a plan view of one of the sliders of FIG. 1E from below the recording medium.

FIG. 2AA illustrates a cross sectional view of the slider of FIG. 2A taken along lines A-A.

FIG. 2B illustrates a plan view of one of the sliders of FIG. 1E from above the recording medium.

FIG. 2BB illustrates a cross sectional view of the slider of FIG. 2B taken along lines B-B.

DETAILED DESCRIPTION OF THE INVENTION

Figure 1A:
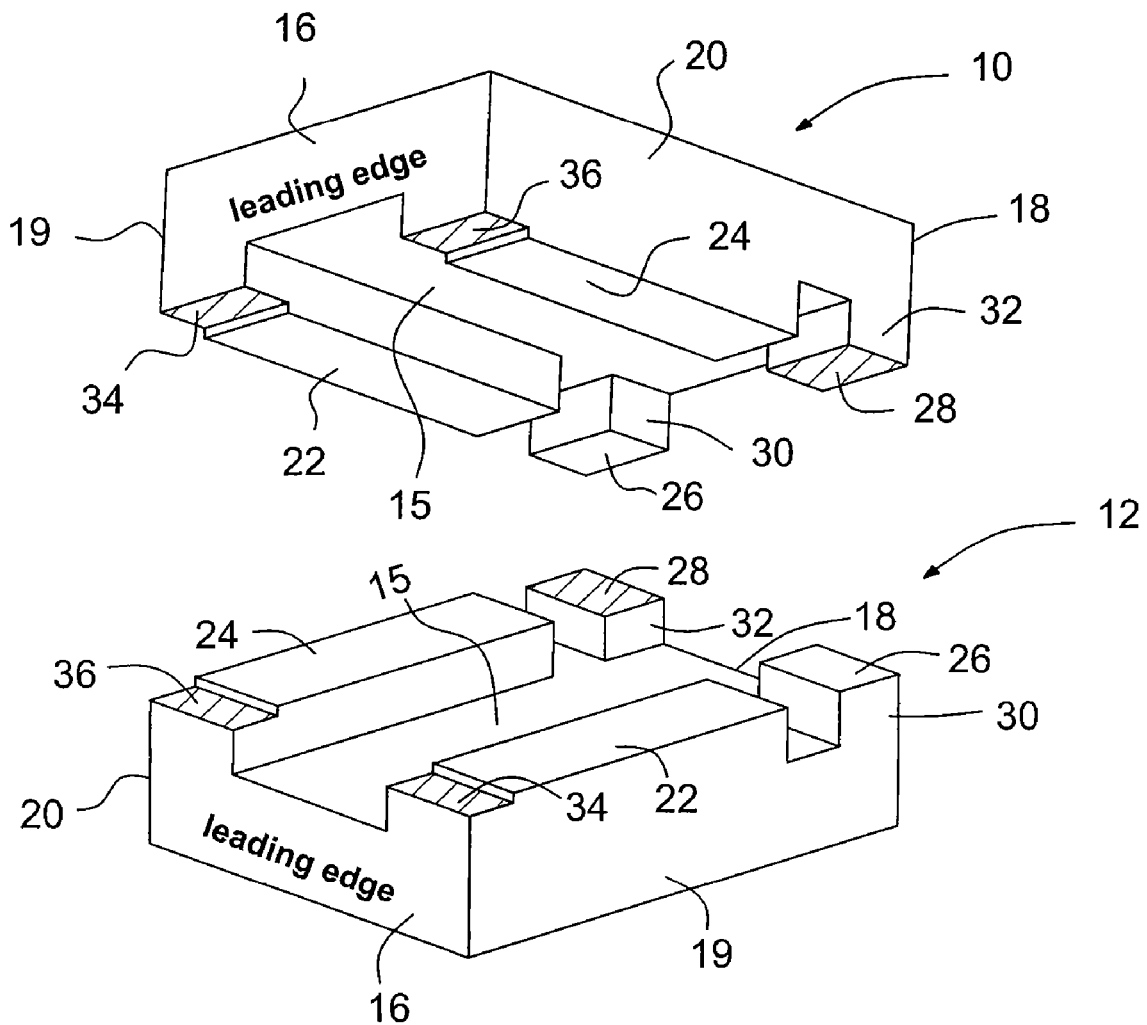
FIG. 1A illustrates a slider arrangement with a uniformly etched rear pad.

The invention in some aspects relates to the air bearing characteristics of a slider interface that utilizes a high speed metal foil disk. As such, the invention describes various slider geometries with optimized air bearing characteristics. In one embodiment, the invention defines an opposed pico sized (about 1.25 mm×about 1.00 mm) slider air bearing configuration that provides advantages when used with a high speed metal foil disk in either a fixed or removable disk format. The air bearing surface may be configured to take advantage of both the static stiffness and dynamic flexibility of the disk in providing uniform static fly height over the disk data zone and an increased ability to avoid contact between the slider and disk when exposed to mechanical shock. This allows for a reduced exposure to contact and wear as well as a reduced likelihood of lost recorded data.

When providing a metal foil disk in a high speed disk drive, materials and disk thicknesses must be considered, especially those that can be manufactured in high volume at reasonable cost. In some cases, the recording medium may be constructed of a nickel disk substrate material, and the disk thickness may be about 25.4 μm (0.001 in). However, the advantages of the invention may be obtained with other disk thicknesses and other metallic substrates. The invention is best utilized with disk thicknesses that are in the range of less than about 0.005 inch. In addition to providing excellent high temperature isotropic properties, nickel allows a more crystalline structure in the magnetic layers. This particular disk thickness is relatively thin but may be used in high volume manufacturing as described in Washburn, H., 2000, "Systems and Methods for Making a Magnetic Recording Medium on a Flexible Metal Substrate," U.S. Pat. No. 6,113,753, previously incorporated by reference. Even at this thickness, the nickel disk is over three times stiffer than the Mylar disk considered by White, J., 2005, "Slider Air Bearing Design Enhancements for High Speed Flexible Disk Recording," ASME *Journal of Tribology*, 127, pp. 522-529 (previously incorporated by reference) due to the wide differences in elastic modulus. In general, selection of a metallic substrate increases the disk stiffness significantly and does not allow creation of useful static disk deflection over the slider, unlike the case that was reported by the above referenced White article for the asymmetric opposed slotted rail nano slider arrangement and a Mylar Disk. Also, migration to the smaller pico slider format exacerbates this characteristic.

In a manner related to but distinct from the Mylar Disk described above, the present invention may be based on an opposed slider configuration and makes use of a thin and stiff air film at the recording element (RE) and a thicker and less stiff air film on the other side of the disk and directly opposite the RE, in order to provide improved mechanical shock resistance to the slider/disk interface. In some configurations, the new slider air bearing surface (ABS) may be augmented with transverse pressure contours (TPCs) to assist in providing uniform static fly height over the data surface. The TPC air bearing has found widespread application in hard disk recording head sliders. Detailed descriptions of some TPC air bearings can be found in White, J. W., 1986, "A Uniform Flying Height Rotary Actuated Air Bearing Slider," IEEE *Transactions on Magnetics*, MAG-22, 5; White, J. W., 1986, "An Air Bearing Slider With Uniform Flying Height and Fast Take-Off Characteristics," *Tribology and Mechanics of Magnetic and Optical Recording Systems,*" ASLE, 3, pp. 95-101; White, J. W., 1987, "Dynamic Response of the Transverse Pressure Contour Slider." *Tribology and Mechanics of Magnetic Storage Systems,* 4, STLE SP-22, pp. 72-82; White, J. W., 1996, "Flying Characteristics of the Transverse and Negative Pressure Contour TNP Slider Air Bearing," ASME *Journal of Tribology,* 119, pp. 241-249, incorporated herein by reference.

The slider may be constructed of a very hard material, such as a mixture of aluminum oxide and titanium carbide. The air bearing surfaces that make up the slider face to be positioned toward the disk are typically created by one or more applications of an etching process. The initially flat slider face is covered with a mask that exposes an outline of the various air bearing surfaces. After exposure to the etching process for a period of time, the various features of the air bearing surfaces are formed and appear at a desired depth from the unetched position. Different depths of the various air bearing surfaces on a slider can be provided by the use of additional etching processes and the use of additional masks. Usually, the final slider face that is positioned toward the disk recording surface is composed of one or more air bearing surfaces that lie in the unetched plane of the face and one or more air bearing surfaces that appear at an etched depth below the unetched plane. Typical current etch processes for creation of the air bearing surfaces include ion milling and reactive ion etching. For convenience of discussion, relative heights of air bearing surfaces described herein may be in relation to such an unetched plane.

Figure 1B:
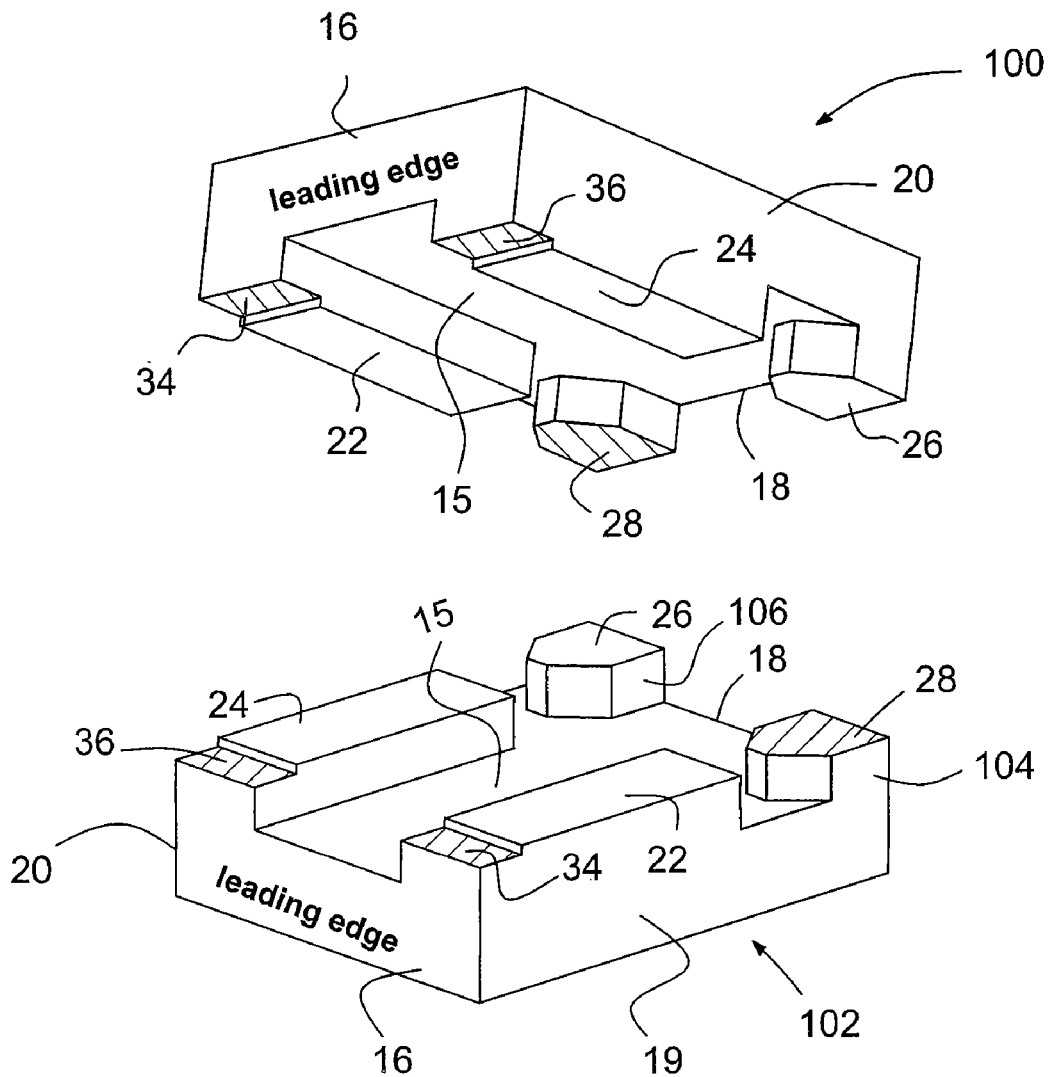
FIG. 1B illustrates a slider arrangement with a uniformly etched shaped rear pad.

The required low fly height and high air bearing stiffness for the RE air film may be accomplished by incorporating the RE in a separate air bearing pad near the slider trailing edge. The size, shape, and air bearing features of the RE pad can be selected to provide the desired fly height and stiffness. The opposed sliders are mounted substantially opposite each other, and the RE pad of each slider is at least generally opposite another air bearing pad. In one preferred configuration, the sliders are mounted directly opposite each other, and the RE pad of each slider is positioned directly opposite another pad of the same overall dimensions. The rear pad opposite the RE pad of each slider may be etched to a depth such that during operation the static air film opposite the RE air film is thicker and has a reduced air bearing stiffness. Creation of the thicker air film and reduced air bearing stiffness opposite the RE pad does not require or depend on disk deflection, unlike existing slider configurations for a Mylar disk. Instead, the asymmetrical air bearing properties result primarily from the slider structure and a minimized static disk deflection made possible by the stiffer metal foil disk being positioned between sliders of a smaller footprint. The combination of a thin and stiff air film over the RE pad and a thick and less stiff opposing air film does deliver to the disk an increased dynamic flexibility. This provides to the disk an enhanced ability to deflect away from impinging contact when subjected to the high air film pressure developed following a mechanical shock. Some examples of this novel slider configuration in their simplest form are shown in FIGS. 1A and 1B. Other examples with enhanced air bearing features appear in FIGS. 1C-1F and will be described later.

FIG. 1A illustrates one embodiment of a pair of sliders 10 and 12 which are nearly identical to each other. For convenience of discussion, similar elements will use similar reference numerals. Sliders 10 and 12 each have a face 15 which faces the recording medium, a leading edge 16 and a trailing edge 18 for holding a recording element. Faces 15 further include a pair of side edges 19 and 20. Face 15 of sliders 10 and 12 also each include multiple air bearing surfaces 22, 24, 26 and 28. A recording element (RE) may be included in a pad 30 containing air bearing surface 26. Also, a pad 32 contains air bearing surface 28.

Slider inlet compression steps 34 and 36 may be etched into surfaces 22 and 24, respectively, and function to pressurize the incoming air flow. The depth of steps 34 and 36 relative to surfaces 22 and 24 may be in the range of less than about one μm. Also, surfaces 22 and 24 may conveniently be unetched. As such, a plane passing through surfaces 22 and 24 may conveniently be referred to as an unetched plane. Depths of other etched surfaces may be made in relation to such an unetched plane. Such an unetched plane may also be used when describing etch depths with any of the sliders described herein. Further, it will be appreciated that all air bearing surfaces of a slider could be etched. In such cases, reference may be made to etch depths relative to an original unetched plane or to the highest air bearing surface after etching.

Air bearing surface 28 is etched to a depth that is greater than that of air bearing surface 26 relative to an unetched plane. Also, air bearing surface 28 may be etched to a depth greater than that of surfaces 22 and 24 (which may define the unetched plane). This may be accomplished by uniformly etching surface 28. In some cases, surface 28 may be etched to a depth greater than that of surface 26 by a distance that is in the range of less than about two μm. A uniform depth single etch over the entire pad 32 opposite pad 30 which contains the RE may allow all the air bearing features of the slider to be constructed with a single etch process. That is, the slider inlet compression steps 34 and 36, various TPC features (if included), and rear pad etch on surface 28 can each be produced with the same process. In that case, the pressure level and stiffness of pad 32 are set primarily by the etch depth, disk speed, fly height, slider pitch and roll orientation, and to a lesser degree by other operating conditions. The pressure level and stiffness of the etched pad 32 can be adjusted by changing the uniform etch depth level. In general, the optimum etch depth, based on air bearing characteristics, for the slider inlet step and TPC sections may be different than that for the rear pad. If so, this introduces the need for multiple etch depths and multiple etch processes to create the air bearing features.

FIG. 1B illustrates sliders 100 and 102 that are similar to sliders 10 and 12 of FIG. 1A, except for the shape of the rear pads. As such, sliders 100 and 102 will be shown and described using similar reference numerals for similar elements. Rear pads 104 and 106 of sliders 100 and 102 have tapered sided edges, as compared to square pads 30 and 32 of sliders 10 and 12. Rear pad 104 may hold the RE. Such tapering of pads 104 and 106 may be useful in minimizing contact between slider and disk and in deflecting away small particles in the air flow from the lowest fly height areas. Also, it will be appreciated that other shapes for the rear pads may be used, such as smoothly shaped edge contours that minimize the appearance of sharp corners and reduce the likelihood of contact damage between slider and disk.

Figure 1C:
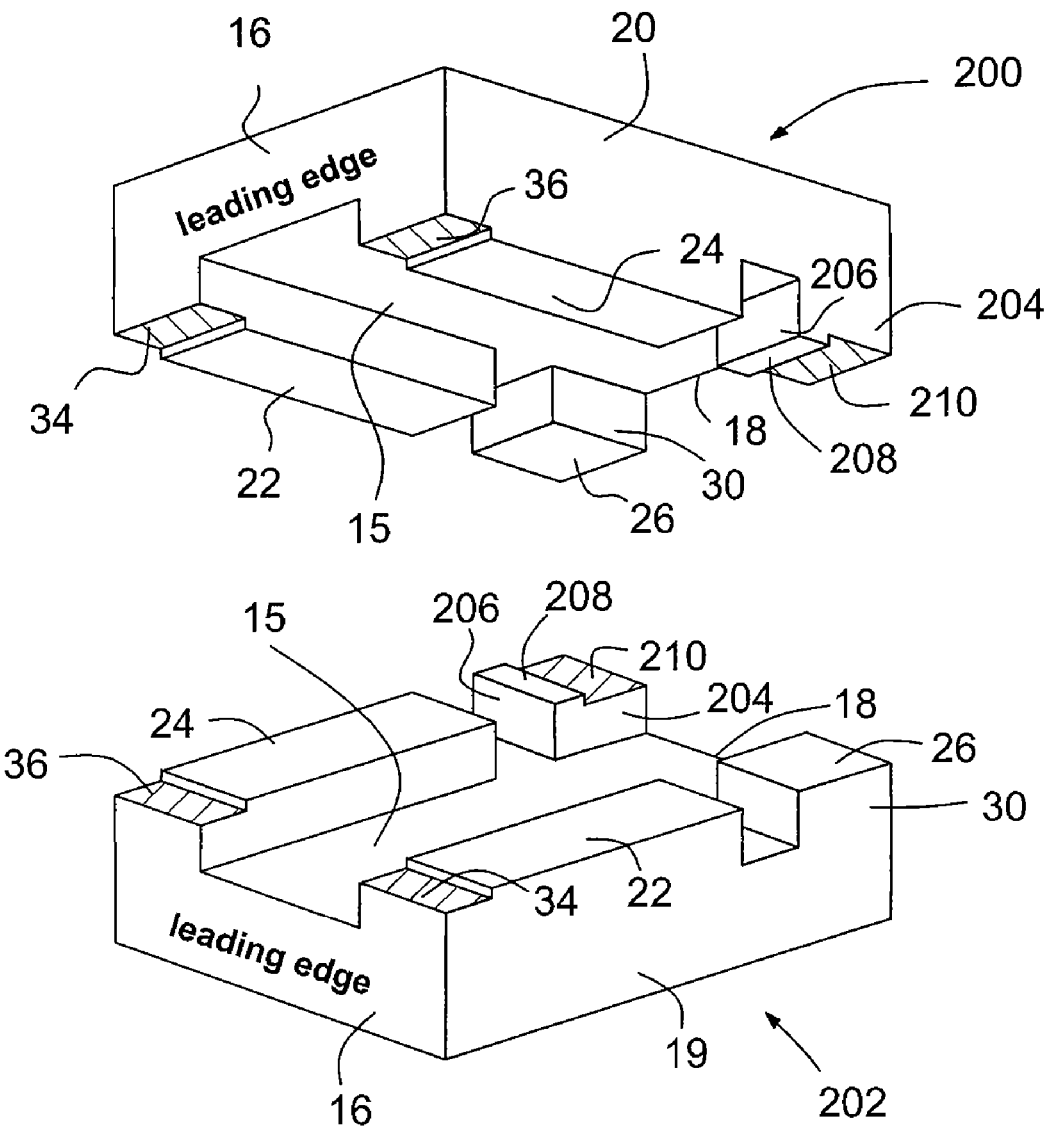
FIG. 1C illustrates a slider arrangement with a reverse step rear pad.

In addition to the shapes of pads, the etched rear pad can be configured with various step geometries based on one or more etch processes. For example, FIG. 1C illustrates sliders 200 and 202 which are similar to sliders 10 and 12 except for the etched rear pad. As such, sliders 200 and 202 will be shown and described using similar reference numerals for similar elements. Sliders 200 and 202 include a rear etched pad 204 having a leading edge 206 with an air bearing surface 208 that is not etched. Downstream of surface 208 is an etched region 210 which is positioned at a finite distance downstream of the leading edge 206 to create a reverse step and a sub-ambient pressure over the etched portion 210 of the rear pad. The depth of the etch may be in the range of less than about two μm. This configuration provides for more variation of air film stiffness across the disk at the location of the RE which is held by pad 30.

Figure 1D:
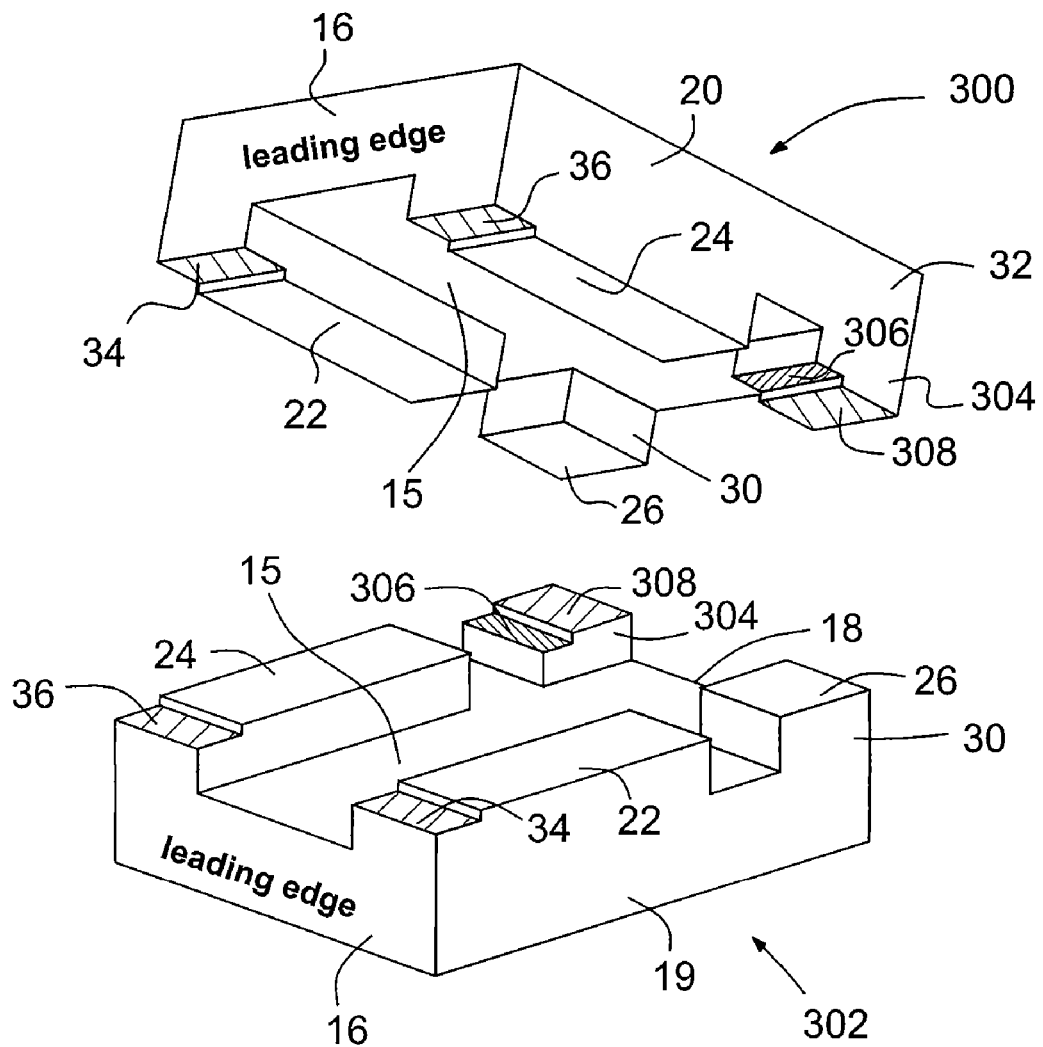
FIG. 1D illustrates a slider arrangement with a compression step rear pad.

As another example, FIG. 1D illustrates sliders 300 and 302 that is similar to the sliders of FIG. 1C (and will use the same reference numerals for the same elements) except that a rear pad 304 has a two-etch configuration to define two air bearing surfaces 306 and 308 that each have etch depths that are deeper than the etch depth of air bearing surface 26. Pad 30 includes the RE. This configuration may create a compression step (surface 306) at the rear pad inlet followed by air bearing surface 308 of uniform etch depth. This allows the pressure level, pressure distribution, and air film stiffness to be fine-tuned over the rear pad 304.

Figure 1E:
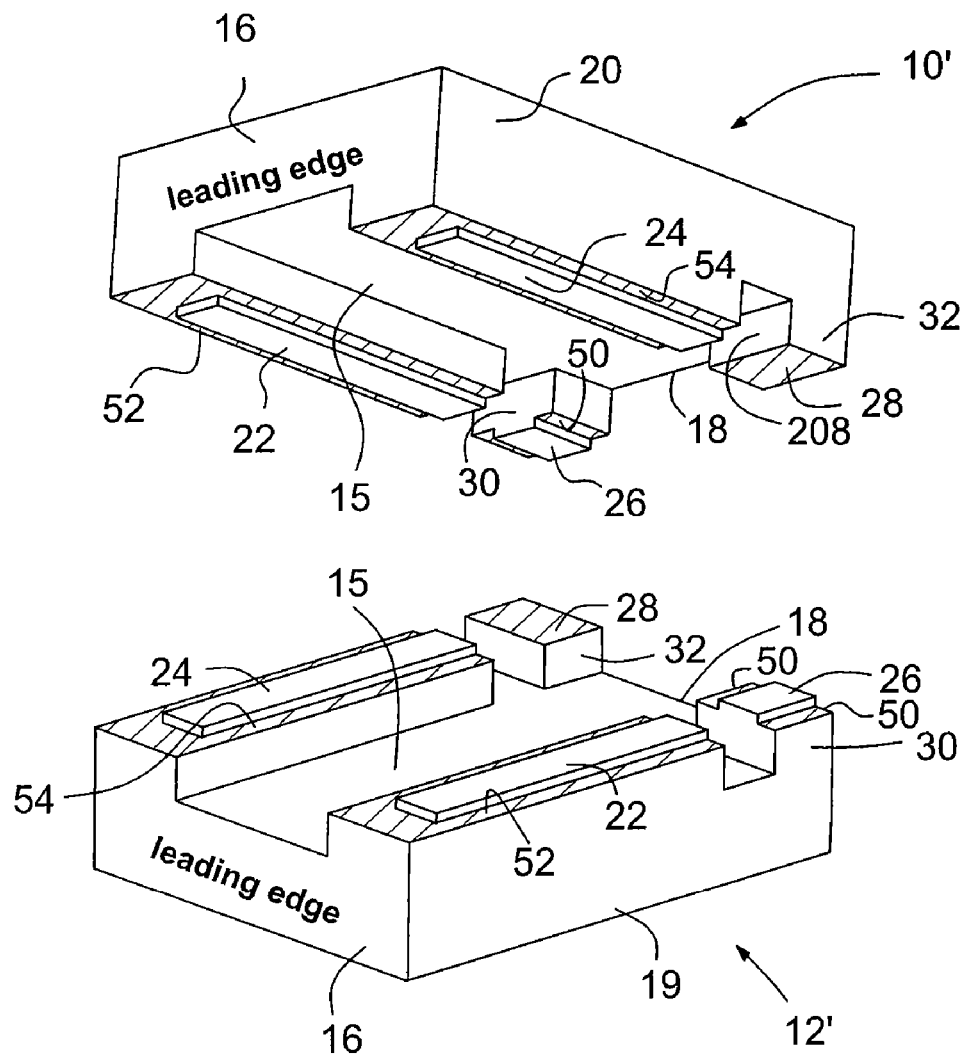
FIG. 1E illustrates a slider arrangement with a uniformly etched rear pad with TPC.

TPC structures can easily be incorporated into the new etched air bearing configuration of the sliders described herein. FIG. 1E illustrates sliders 10' and 12' which are identical to the sliders of FIG. 1A with the addition of TPC edge steps in pad 30 and adjacent air bearing surfaces 22 and 24. FIG. 1E uses the same reference numerals used in FIG. 1A, with the TPCs in pad 30 (which holds the RE) being referenced with numeral 50 and the TPCs in air bearing surfaces 22 and 24 using reference numerals 52 and 54. Specific dimensions for sliders 10' and 12' will be described in greater detail hereinafter with reference to at least FIG. 2.

Figure 1F:
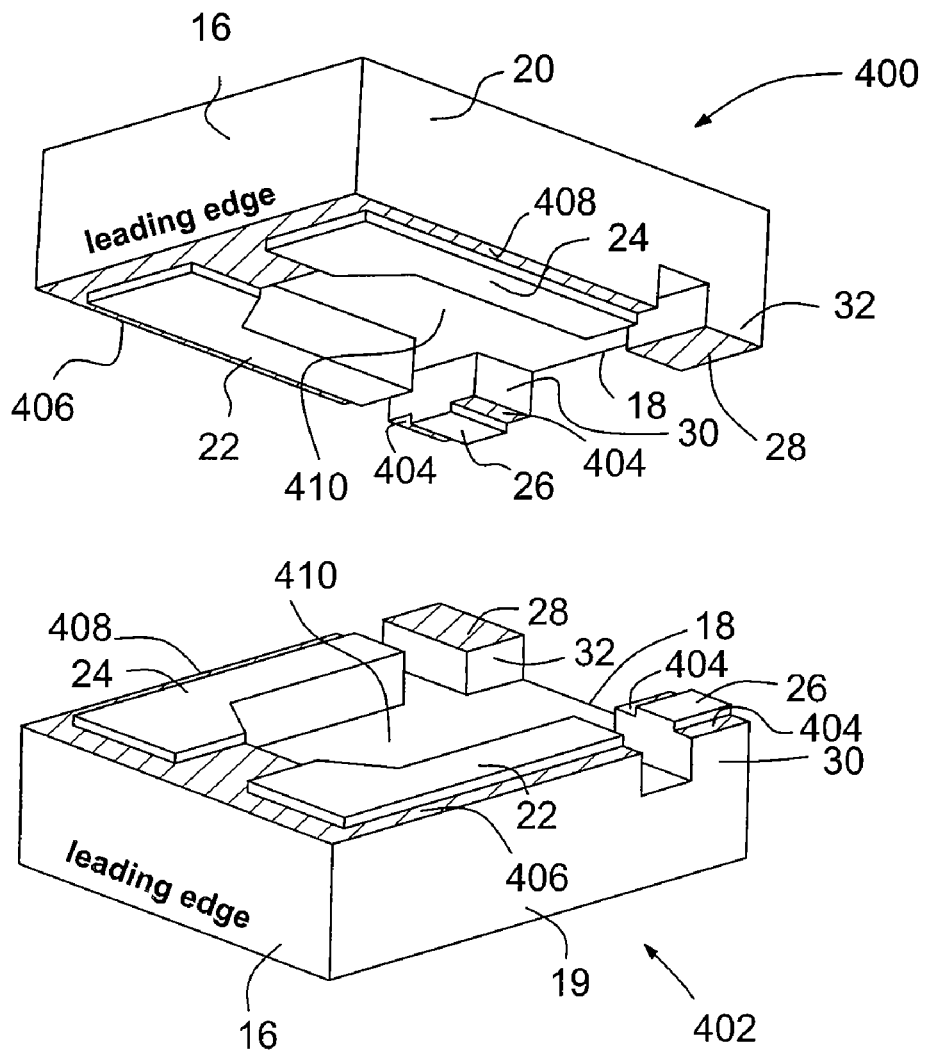
FIG. 1F illustrates a slider arrangement with a uniformly etched rear pad with TPC and vacuum cavity.

FIG. 1F illustrates a pair of sliders 400 and 402 which are similar to the sliders of FIG. 1E to include TPC edge steps 404, 406 and 408 in air bearing surfaces 26, 22 and 24, respectively, along with a vacuum cavity 410. Pad 30 includes the RE. Elements that are similar to the same elements in FIG. 1E are referred to with the same reference numerals.

As illustrated in the above embodiments, the high air bearing stiffness and low fly height at the RE are satisfied as in a conventional design, while the low stiffness and high fly height of the opposing air film are established by a partial degradation of the opposing air bearing. This combination of air bearing characteristics on opposing sides of the disk act together to provide an improved response to mechanical shock. The general features of this air bearing interface will be described below, some by numerical examples.

Figure 2:
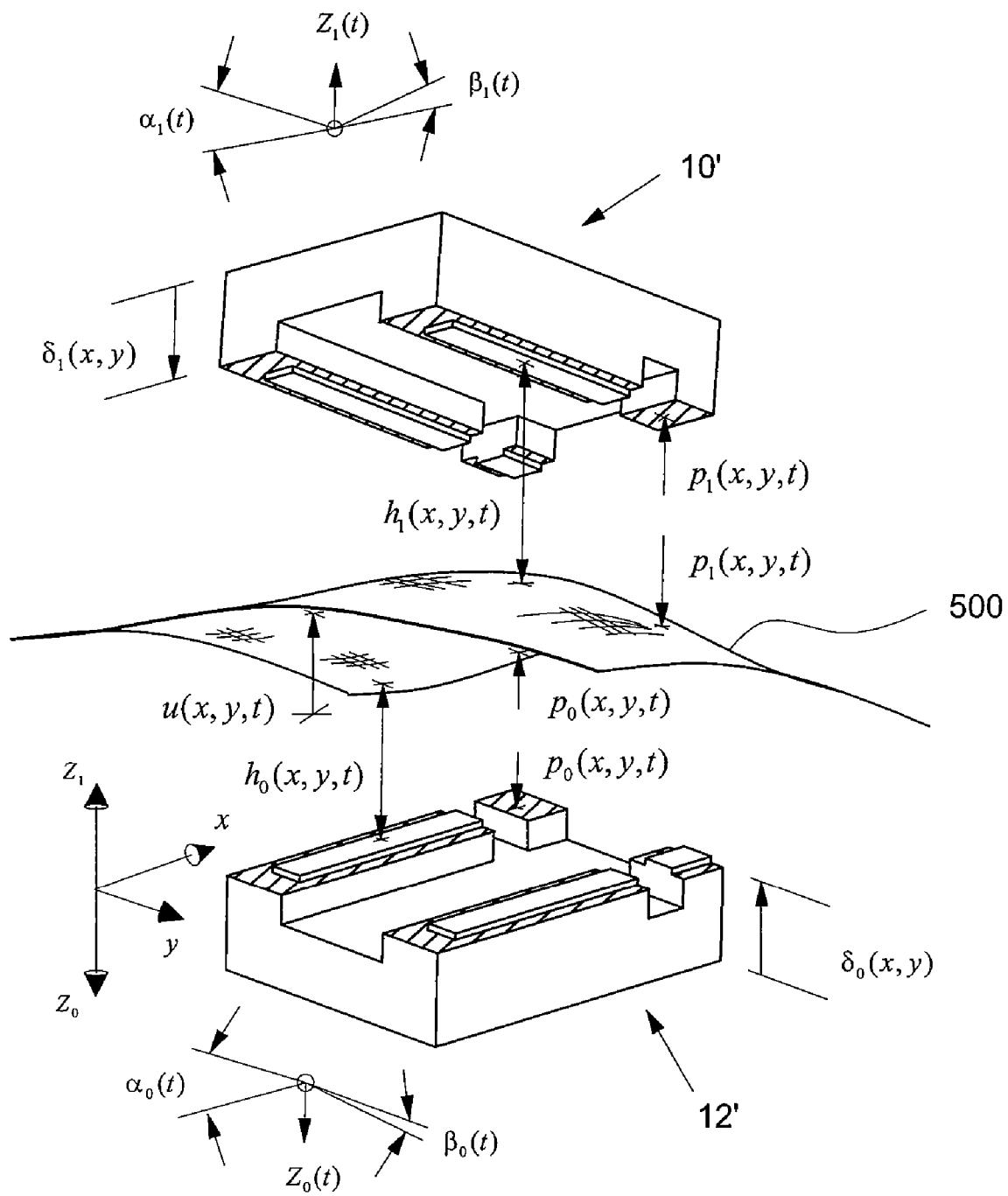
FIG. 2 illustrates the slider arrangement of FIG. 1E positioned on opposite sides of a recording medium according to the invention.
Figure 2C:
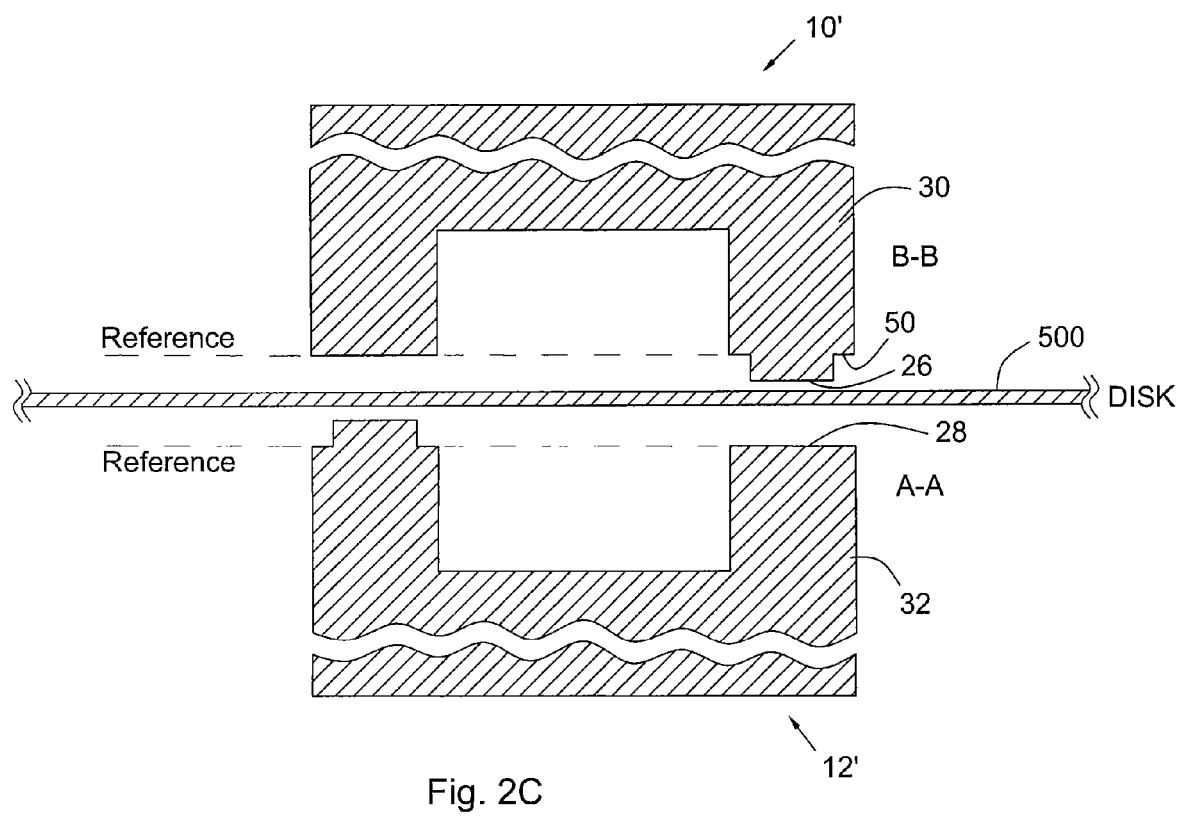
FIG. 2C illustrates the sliders of FIGS. 2AA and 2BB disposed on opposite sides of a recording medium.

FIG. 2 illustrates the sliders 10' and 12' of FIG. 1E disposed on opposite sides of a flexible recording medium 500 which comprises a high speed metal foil disk. Sliders 10' and 12' are each loaded against metal foil disk 500.

FIGS. 2A, 2AA, 2B and 2BB are provided to illustrate exemplary dimensions for certain elements of sliders 10' and 12'. As shown in these figures, air bearing surface 28 is etched to a depth greater than that of air bearing surface 26 by a distance H that is in the range of less than about two μm. TPCs 50 may have a width L that is in the range of less than about 0.010 inch.

Recording element 600 is located at the trailing edge of pad 30. FIG. 1C illustrates sliders 10' and 12' positioned on opposite sides of disk 500. Flying heights relative to air bearing surfaces 26 and 28 will be described hereinafter.

Each slider 10' and 12' is separated from the disk 500 by a slightly rarefied air film that develops a bearing effect, and each slider 10' and 12' is gimbal mounted to a mechanical arm structure (not shown) that positions the slider over the disk data surface. The gimbal provides to each slider one translational degree of freedom with displacement given by Z(t) and two rotational (pitch and roll) degrees of freedom whose displacements are given by $\alpha(t)$ and $\beta(t)$, respectively. Slider motion is governed by translational forces and rotational moments acting on the slider. For convenience of discussion, the region below the disk 500 is referred to as side 0 while that above is identified as side 1. The side 0 slider motion is described by the rigid body equations of motion (1-3), while the side 1 slider motion is governed by Eqs. (7-9). In Eqs. (1) and (7), slider mass is given by m, and $(C_z, K_z, F)$ represent damping, spring and applied force influences, respectively, from the arm structure on the slider in a direction perpendicular to the plane of the disk. Air film pressure is given by p(x,y,t), and the effect of a distributed pressure involves an integration of the pressure force and moments over the slider surface in the rigid body equations of motion. In Eqs. (2) and (8), slider pitch inertia is given by $I_\alpha$, and $(C_\alpha, K_\alpha, M_\alpha)$ represent damping, spring and moment influences, respectively, from the arm structure on the slider in the pitch direction. Corresponding terms appear in Eqs. (3) and (9) for roll motion. Each air film is governed by the compressible form of the Reynolds equation of lubrication corrected for first order molecular slip effects as shown in Eqs. (4) and (6). The air film thickness is given by h(x,y,t) while $(\lambda_a, p_a)$ represents mean free path and pressure at ambient condition. Air film viscosity is represented by μ, and disk motion velocity components are given by $(V_x, V_y)$. The deflection of the disk, u(x,y,t), is governed by Eq. (5). This equation, based on a consideration of translational forces acting on a disk differential element of thickness δ and mass density ρ, includes membrane, bending, inertia and air film pressure loading effects. In Eq. (5), $(\sigma_{xx}, \sigma_{yy}, \sigma_{xy})$ represent disk midsurface stress components, while disk stiffness is given by D. Eqs. (10) and (11) represent simple algebraic expressions for flying height based on slider position and orientation, slider air bearing surface shape, and disk deflection. The overall theoretical air bearing interface model then consists of eleven coupled equations in eleven unknowns, as shown in Eqs. (1)-(11). This model was reduced to a computational algorithm based on variable grid finite differences, and a computer code called FLEXTRAN was developed by the author that solves the system of equations for static and dynamic analysis of complex slider air bearing geometries. In most cases, the computed variables of primary interest are the air film thicknesses (fly heights) $h_0(x,y,t)$ and $h_1(x,y,t)$, and especially the minimum fly heights and fly heights at the slider recording element locations that result for given slider geometries, disk properties and operating conditions. Dynamic solutions are obtained by a direct numerical integration in time of Eqs. (1)-(11). Static solutions are obtained by integrating the equations in time and observing the steady-state asymptotically at large simulated time as viscosity (and other non-zero damping effects) dampens changes in the computed variables. Since the solution of Eqs. (4)-(6) represents most of the computational effort in advancing the solution from one time level to the next, special attention is given to the solution of these equations by alternating direction methods that take advantage of the properties of tightly banded matrices. Using a spatially factored algorithm, the Reynolds equation requires solution of tri-diagonal systems of equations, while solution of the disk deflection equation involves systems of qui-diagonal equations. These methods are described in White, J. W., and Nigam, A., 1980, "A Factored Implicit Scheme for the Numerical Solution of the Reynolds Equation at Very Low Spacings," ASME *Journal of Lubrication Technology,"* 102, pp. 80-85 and White, J. W., 1987, "A Study of Low Flying Height Heads for Stretched Surface Recording," *Tribology and Mechanics of Magnetic Storage Systems*, 4, STLE SP-22, pp. 12-20, the complete disclosures of which are herein incorporated by reference, and make use of a single rectangular grid while providing full second-order time-accuracy for advancing the solution in time. The computation required to advance the solution from one time level to the next is non-iterative. Typical required compute time for an opposed slider static analysis on a 3.0 GHz clock rate system is around 30 minutes.

Analytical and numerical solution of disk deflection for the full disk is well researched for the case of simple transverse loads and simple head geometries as described in Benson, R. C., and Bogy, D. F., 1978, "Deflection of a Very Flexible Spinning Disk Due to a Stationary Transverse Load," ASME *Journal of Applied Mechanics*, 45, pp. 636-642; Adams, G. G., 1980, "Procedures for the Study of the Flexible-Disk to Head Interface," IBM *Journal of Research and Development*, 24, pp. 512-517; Adams, G. G., and Averill, J. P., 1988, "Simulation of the Floppy-Disk/Head Interface," *Tribology and Mechanics of Magnetic Storage Systems*, 5, STLE SP-25, pp. 135-141; and Wu, R. Y., and Adams, G. G., 1997, "The Effect of Disk Warpage/Skew on the Deflection and Vibration of a Flexible Disk Spinning Above a Baseplate and in Contact With a Point-Head," ASME *Journal of Tribology*, 119, pp. 64-70, the complete disclosures of which are herein incorporated by reference. However, incorporation of complex geometry opposed recording head sliders into an analysis including deflection of the full disk would be a challenge in terms of both numerical complexity and required compute time. Because the primary interest here is in the slider/disk interface, the computation of the disk deflection in Eq. (5) is only extended a few slider lengths beyond the slider, forming a rectangular clamped boundary. This does limit how close to the disk inner clamp radius and outer free edge the analysis can be accurately performed. However, except for these extreme radial limitations, it is expected that this algorithm represents an accurate model of the slider/disk air bearing interface for static studies and for dynamic studies in which the dynamic event originates at the slider/disk interface and in which the time scale of interest does not allow the extent of the dynamic event to propagate as far as the disk deflection computational boundary. The computed results of the FLEX-TRAN code have been shown to agree closely with independently obtained proprietary in-house experimental results from the data storage industry.

$$m_0 \frac{d^2 Z_0}{dt^2} + C_{z0} \frac{dZ_0}{dt} + K_{z0} Z_0 - m_0 g + F_0 = \int (p_0 - p_a) dA_0 \tag{1}$$

$$I_{\alpha 0} \frac{d^2 \alpha_0}{dt^2} + C_{\alpha 0} \frac{d\alpha_0}{dt} + K_{\alpha 0} \alpha_0 + M_{\alpha 0} + (F_0 + K_{z0} Z_0)(x_{cg0} - x_{p0}) = \tag{2}$$
$$\int \left[(x_{cg0} - x)(p_0 - p_a) - \frac{z_{cg0} \mu V_x}{h_0 + 2\lambda_a p_a / p_0} + \frac{z_{cg0} h_0}{2} \frac{\partial p_0}{\partial x}\right] dA_0$$

$$I_{\beta 0} \frac{d^2 \beta_0}{dt^2} + C_{\beta 0} \frac{d\beta_0}{dt} + K_{\beta 0} \beta_0 + M_{\beta 0} + (F_0 + K_{z0} Z_0)(y_{cg0} - y_{p0}) = \tag{3}$$
$$\int \left[(y_{cg0} - y)(p_0 - p_a) - \frac{z_{cg0} \mu V_y}{h_0 + 2\lambda_a p_a / p_0} + \frac{z_{cg0} h_0}{2} \frac{\partial p_0}{\partial y}\right] dA_0$$

-continued $$\frac{\partial}{\partial x}\left(h_0^3 p_0 \frac{\partial p_0}{\partial x}\right) + \frac{\partial}{\partial y}\left(h_0^3 p_0 \frac{\partial p_0}{\partial y}\right) + \tag{4}$$
$$6\lambda_a p_a \frac{\partial}{\partial x}\left(h_0^2 \frac{\partial p_0}{\partial x}\right) + 6\lambda_a p_a \frac{\partial}{\partial y}\left(h_0^2 \frac{\partial p_0}{\partial y}\right) =$$
$$6\mu V_x \frac{\partial}{\partial x}(p_0 h_0) + 6\mu V_y \frac{\partial}{\partial y}(p_0 h_0) + 12\mu \frac{\partial (p_0 h_0)}{\partial t}$$

$$\frac{\partial^2 u}{\partial t^2} + 2V_x \frac{\partial^2 u}{\partial x \partial t} + 2V_y \frac{\partial^2 u}{\partial y \partial t} + \left[V_x^2 - \frac{\sigma_{xx}}{\rho}\right]\frac{\partial^2 u}{\partial x^2} + \left[V_y^2 - \frac{\sigma_{yy}}{\rho}\right]\frac{\partial^2 u}{\partial y^2} + \tag{5}$$
$$2\left[V_x V_y - \frac{\sigma_{xy}}{\rho}\right]\frac{\partial^2 u}{\partial x \partial y} + \frac{D}{\rho \delta}\left[\frac{\partial^4 u}{\partial x^4} + 2\frac{\partial^4 u}{\partial x^2 \partial y^2} + \frac{\partial^4 u}{\partial y^4}\right] +$$
$$\frac{c}{\rho \delta}\frac{\partial u}{\partial t} = \frac{(p_0 - p_1)}{\delta} - g$$

$$\frac{\partial}{\partial x}\left(h_1^3 p_1 \frac{\partial p_1}{\partial x}\right) + \frac{\partial}{\partial y}\left(h_1^3 p_1 \frac{\partial p_1}{\partial y}\right) + \tag{6}$$
$$6\lambda_a p_a \frac{\partial}{\partial x}\left(h_1^2 \frac{\partial p_1}{\partial x}\right) + 6\lambda_a p_a \frac{\partial}{\partial y}\left(h_1^2 \frac{\partial p_1}{\partial y}\right) =$$
$$6\mu V_x \frac{\partial}{\partial x}(p_1 h_1) + 6\mu V_y \frac{\partial}{\partial y}(p_1 h_1) + 12\mu \frac{\partial (p_1 h_1)}{\partial t}$$

$$m_1 \frac{d^2 Z_1}{dt^2} + C_{z1} \frac{dZ_1}{dt} + K_{z1} Z_1 + m_1 g + F_1 = \int (p_1 - p_a) dA_1 \tag{7}$$

$$I_{\alpha 1} \frac{d^2 \alpha_1}{dt^2} + C_{\alpha 1} \frac{d\alpha_1}{dt} + K_{\alpha 1} \alpha_1 + M_{\alpha 1} + (F_1 + K_{z1} Z_1)(x_{cg1} - x_{p1}) = \tag{8}$$
$$\int \left[(x_{cg1} - x)(p_1 - p_a) - \frac{z_{cg1} \mu V_x}{h_1 + 2\lambda_a p_a / p_1} + \frac{z_{cg1} h_1}{2} \frac{\partial p_1}{\partial x}\right] dA_1$$

$$I_{\beta 1} \frac{d^2 \beta_1}{dt^2} + C_{\beta 1} \frac{d\beta_1}{dt} + K_{\beta 1} \beta_1 + M_{\beta 1} + (F_1 + K_{z1} Z_1)(y_{cg1} - y_{p1}) = \tag{9}$$
$$\int \left[(y_{cg1} - y)(p_1 - p_a) - \frac{z_{cg1} \mu V_y}{h_1 + 2\lambda_a p_a / p_1} + \frac{z_{cg1} h_1}{2} \frac{\partial p_1}{\partial y}\right] dA_1$$

$$h_0(x, y, t) = f_0[\delta_0(x, y), u(x, y, t), Z_0(t), \alpha_0(t), \beta_0(t)] \tag{10}$$

$$h_1(x, y, t) = f_1[\delta_1(x, y), u(x, y, t), Z_1(t), \alpha_1(t), \beta_1(t)] \tag{11}$$

Numerical Results and Discussion

Figure 3:
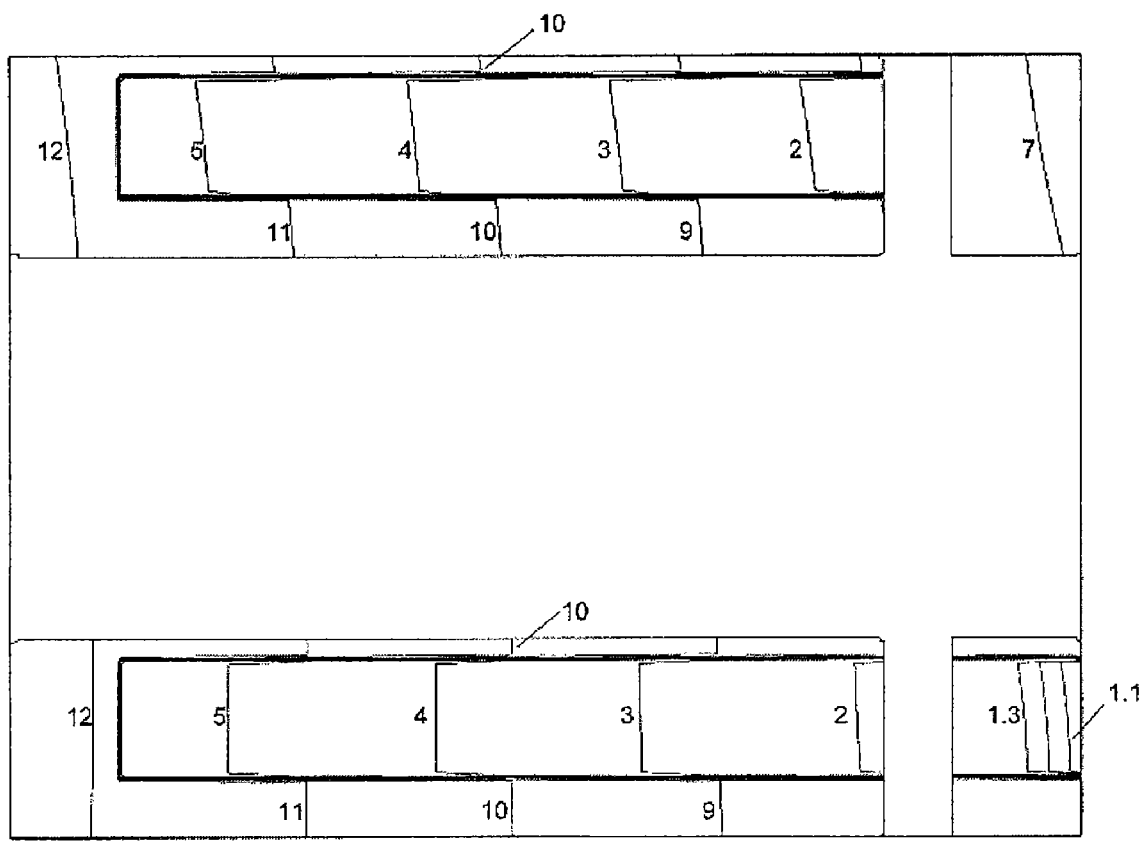
FIG. 3 illustrates one example of dimensionless flying height contours for the slider of FIG. 2A.
Figure 4:
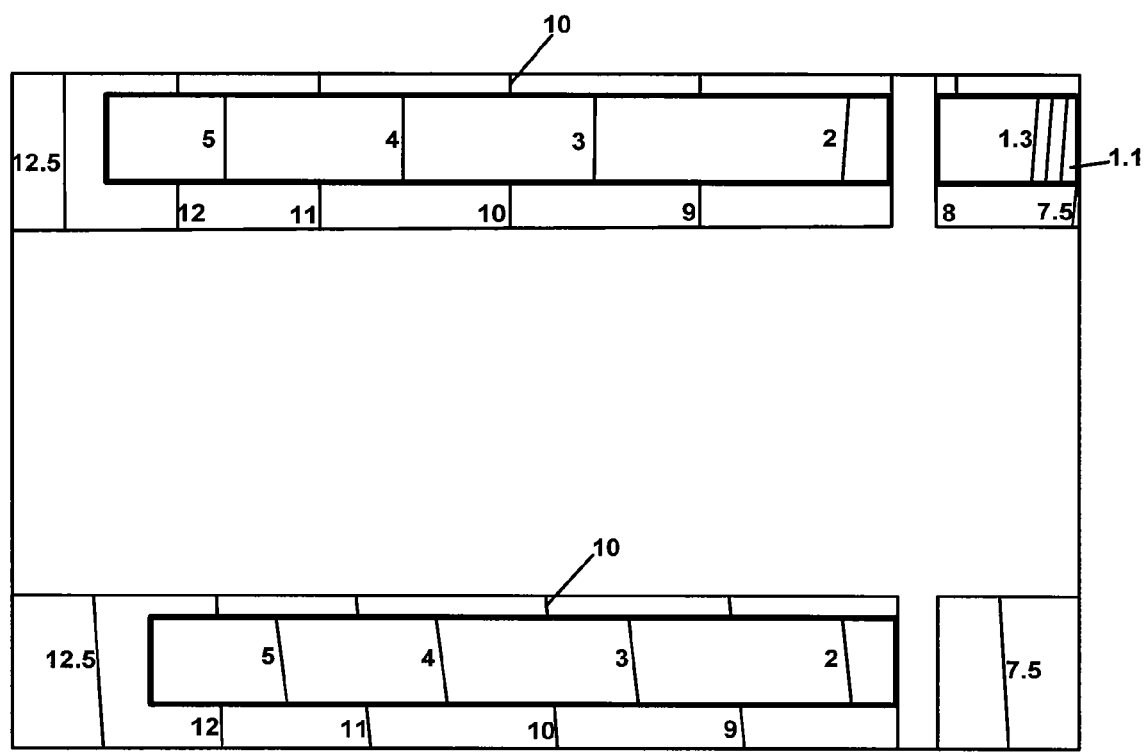
FIG. 4 illustrates one example of dimensionless flying height contours for the slider of FIG. 2B.
Figure 5:
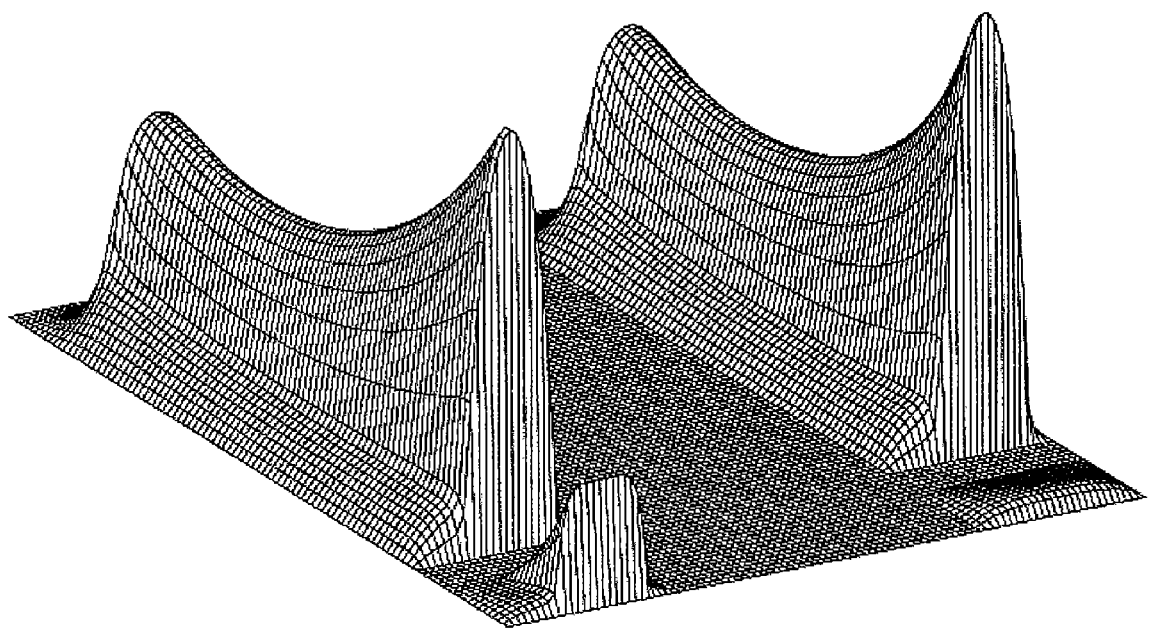
FIG. 5 illustrates one example of a pressure profile for the slider of FIG. 2A.
Figure 6:
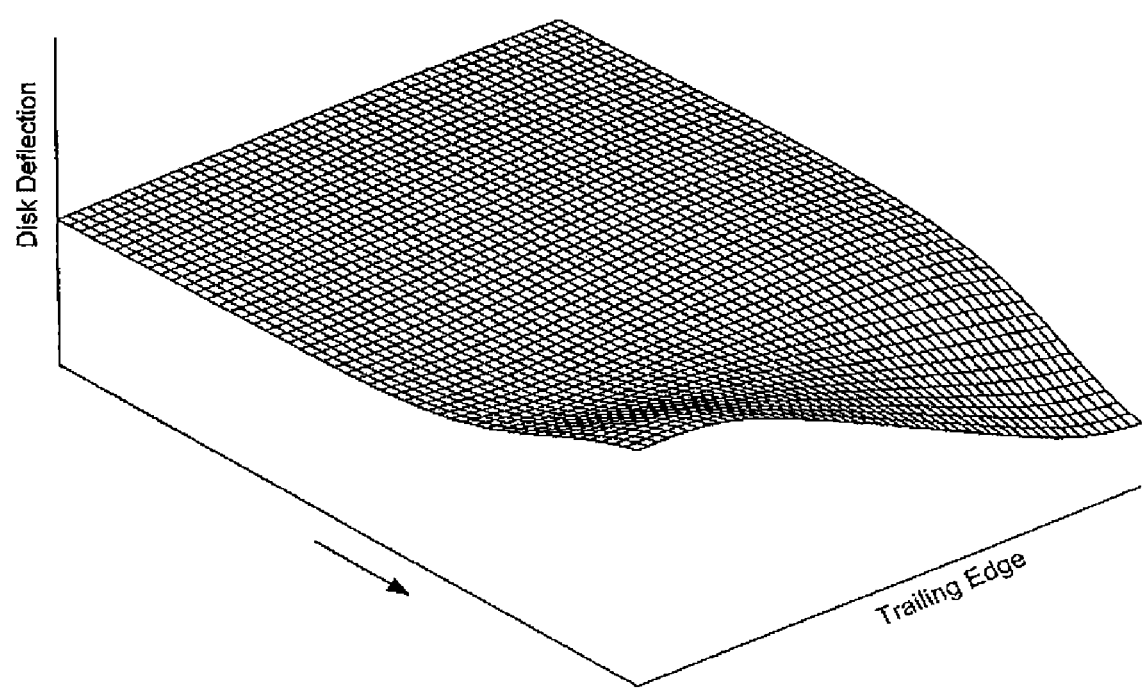
FIG. 6 illustrates a disk deflection profile directly over the sliders for the arrangement of FIG. 2C, with the deflection being at the location of the etched rear pad of the slider.

The following is one, non-limiting example, using a pair of sliders similar to those illustrated in FIG. 1E. However, it will be appreciated that the invention is not limited to this specific example. This example uses a pair of opposed gimbal mounted pico sliders with TPC edge steps that fly on a 3.5 inch metal foil disk spinning at 4500 rpm, similar to the sliders illustrated in FIG. 1E. The disk substrate material is nickel, and the disk thickness is 25.4 µm (0.001 in). Each slider has two leading edge pads and two trailing edge pads, all of the same width. A single shallow etch depth of 0.254 µm (10 µin) defines the air bearing inlet step and TPC depth, while the overall pad width is 254 µm (0.010 in). The two TPC steps facing the disk outer radius have a width of 25.4 µm (0.001 in) while those facing the inner radius have a width of 76.2 µm (0.003 in). The leading and trailing pads are separated by a 76.4 µm (0.003 in) wide ambient pressure slot, and the RE is located near the trailing edge at the center of one of the rear pads. The slider preload force is 24.5 mN (2.5 $g_f$), and the sliders fly at a zero skew angle. The air bearing surfaces are configured so that the face of the trailing pad without RE of each slider is uniformly etched to a depth of 0.254 µm (10 µin). And the sliders are arranged so that each uniformly etched trailing pad opposes a trailing pad with RE of the other slider. The two opposed sliders are shown in FIG. 1(e), and initially fly in static equilibrium. The minimum flying height is around 37 nm (the minimum fly height of each slider is within one nm of the other). Dimensionless fly height contours for the two sliders appear in FIGS. 3-4. The region below the disk is referred to as side 0 while that above is side 1. The fly height contour values of each slider are normalized with respect to the minimum value for that slider. The static fly height profiles are nearly identical for the opposed leading edge pads. Fly height over the etched trailing edge pads is around 7 to 8 times the minimum value that is positioned over the unetched trailing pad. The static pressure profile for the side 0 slider is shown in FIG. 5 where the maximum value is 3.25 atm. Notice that the two trailing pads create less air bearing pressure since neither has a leading edge pressurization contour. In addition, the uniformly etched trailing pad develops a substantially lower static pressure due to its higher fly height. The static disk deflection profile directly over the sliders is presented in FIG. 6 where the variation of disk deflection is only 21 nm. Three factors contribute to this low number. First, the sliders are each of the same overall size and gimbal mounted with the same preload force and load point. Second, the opposing upstream pads of the two sliders are identical. And third, the increased stiffness of the metal foil disk resists static deflection. Most of the 21 nm of deflection occurs near the trailing edge where the wide variation of opposing pad fly height occurs. On side 0, the higher pressure of the unetched trailing pad deflects the disk upward slightly, while on side 1, the higher pressure of the unetched trailing pad deflects the disk downward slightly. When this slider assembly is mounted so that the skew angle varies between −8.5 degrees at the inner recording track and +8.5 degrees at the outer track, the static fly height of each slider at its RE varies only 2 nm over the data band. This is largely accomplished by the influence of the transverse pressure contours as the skew angle and disk velocity both vary with radius. A uniform fly height over the data zone is important in order to maximize storage and minimize contact between slider and disk.

Figure 7:
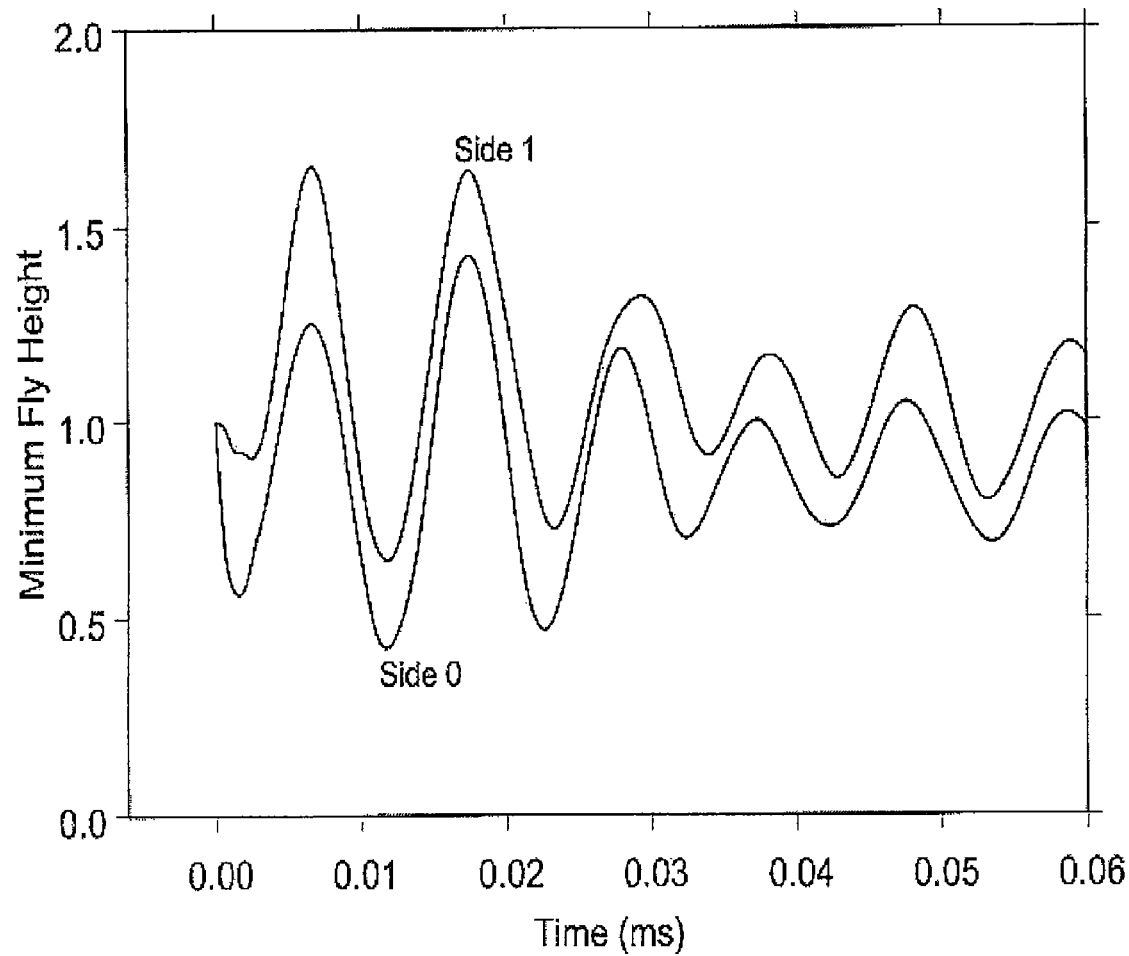
FIG. 7 illustrates a flying height response for the sliders included in the arrangement of FIG. 2C.
Figure 8:
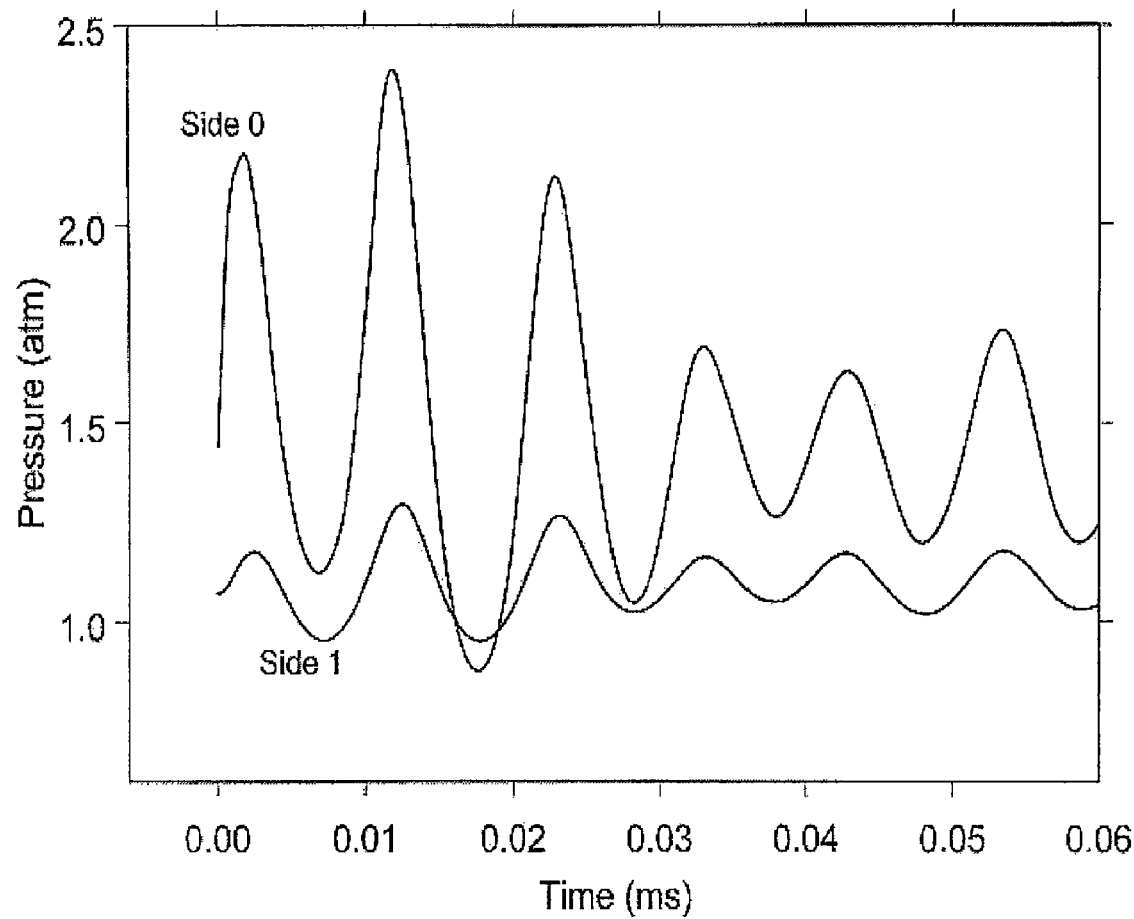
FIG. 8 illustrates a pressure response at the recording elements held by the sliders included in the arrangement of FIG. 2C.
Figure 9:
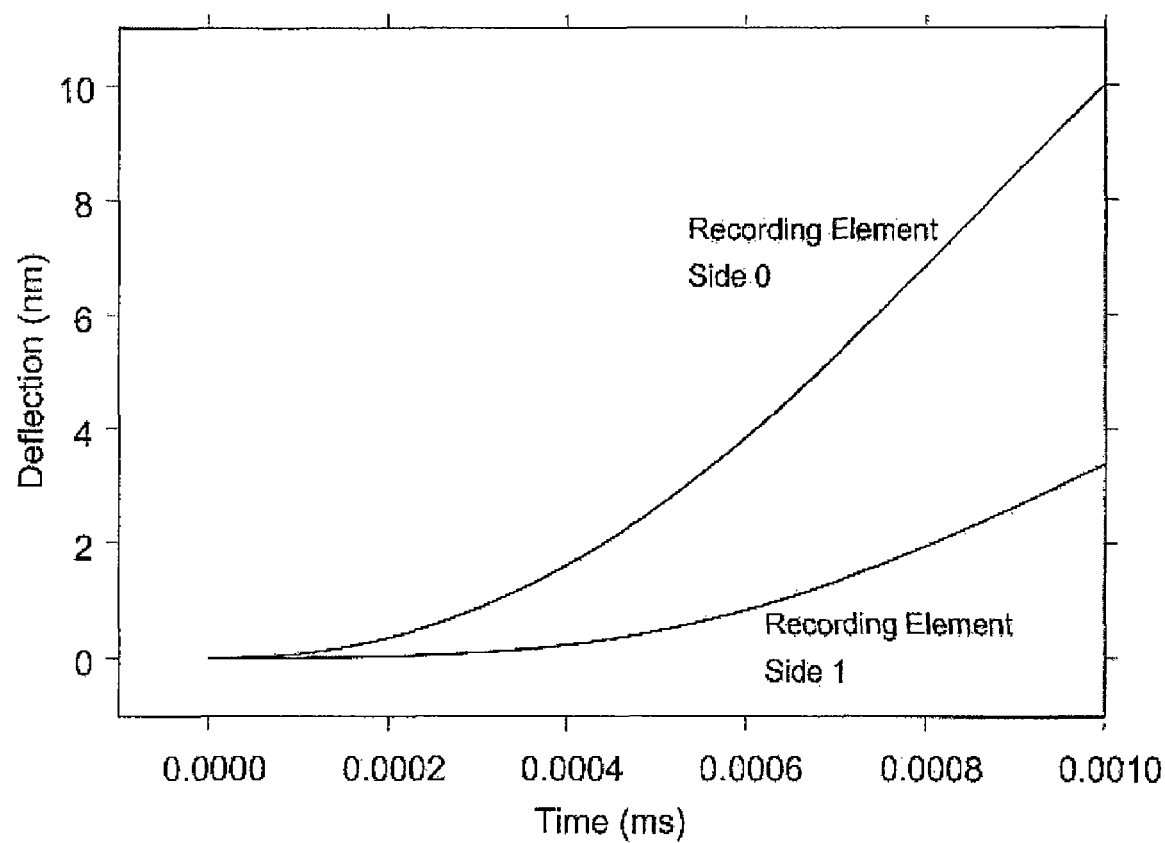
FIG. 9 illustrates a short time disk deflection history at both recording elements held by the sliders included in the arrangement of FIG. 2C.
Figure 10:
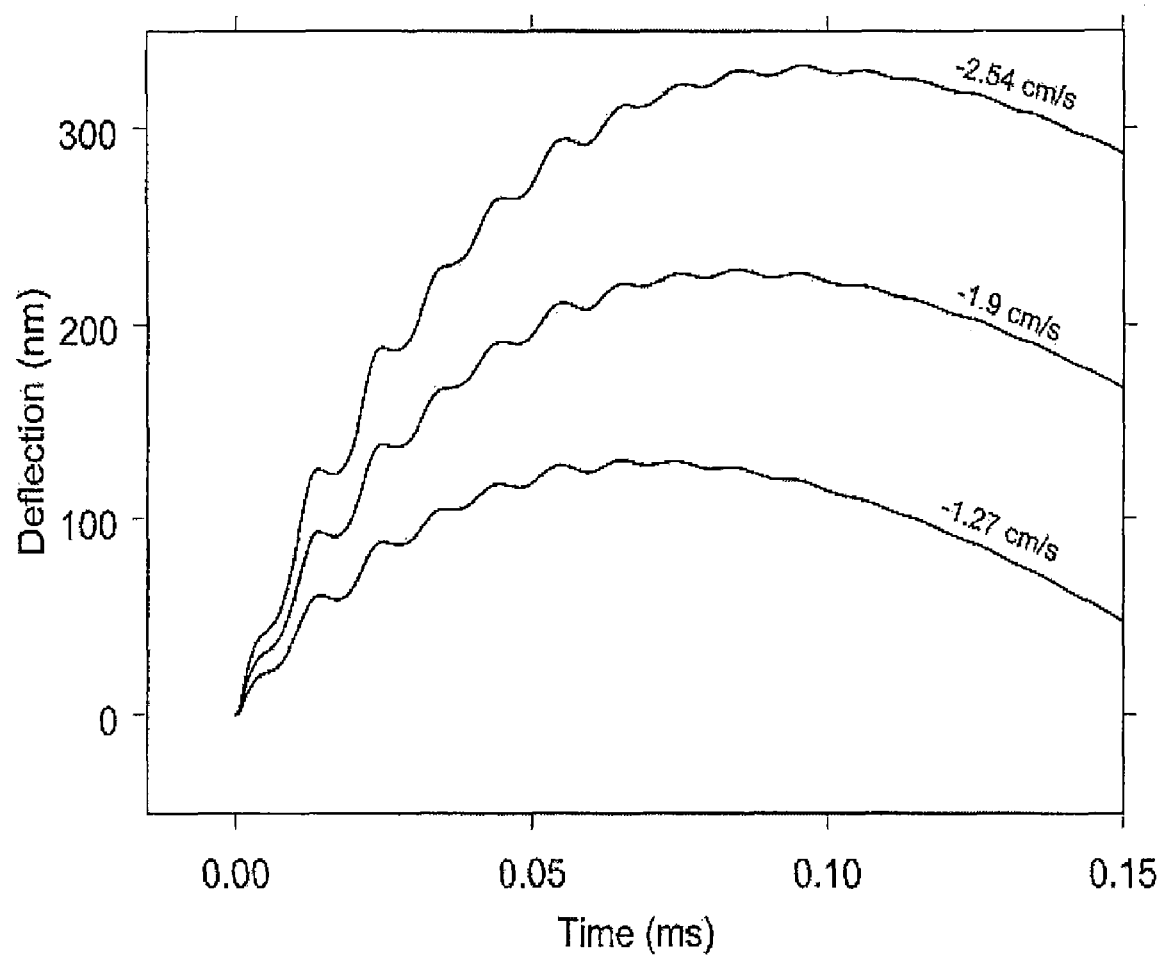
FIG. 10 illustrates a longer period disk deflection history for the slider of FIG. 2A.

Next, one of the sliders of the assembly will be subjected to a mechanical shock. The slider assembly is initially in static equilibrium. A shock is then applied to the side 0 slider at its center of gravity and drives the slider toward the disk at an initial velocity of 2.54 cm/s (1 in/s). The time response of the resulting normalized minimum fly height of each slider is presented in FIG. 7, while the pressure of each air film at the location of the side 0 RE is given on FIG. 8. When the side 0 slider is struck, its motion immediately begins to compress the side 0 air film, increasing its pressure. In the vicinity of the side 0 RE, as the pressure difference between opposing air films increases, the disk begins to deflect away from the approaching side 0 slider, which then initiates a pressure build-up in the side 1 air film. Since the side 0 air film is stiffer than that of side 1, the pressure build-up on side 0 is larger and more rapid. The result is that in the very short time period following the shock, the disk is able to deflect sufficiently at the nanometer level so that surface contact is easily avoided. Since the mechanical shock of this example is to the side 0 slider, that slider experiences the lower minimum fly height. This is because the RE air film of the shocked slider must absorb the initial energy of the shock before the disk begins to deflect away. Disk deflection immediately following the shock is shown in FIG. 9 for the two RE locations of the slider assembly. Deflection at the side 0 RE is larger than that at side 1 and is explained by the difference in air film stiffness on the two side 0 trailing pads. Disk deflection at the side 0 RE location is given in FIG. 10 over a longer period of time and for several shock velocities. The higher but different frequencies of the opposing slider air bearings can be observed as the sliders beat against the lower frequency disk while it reacts to the shock.

Figure 11:
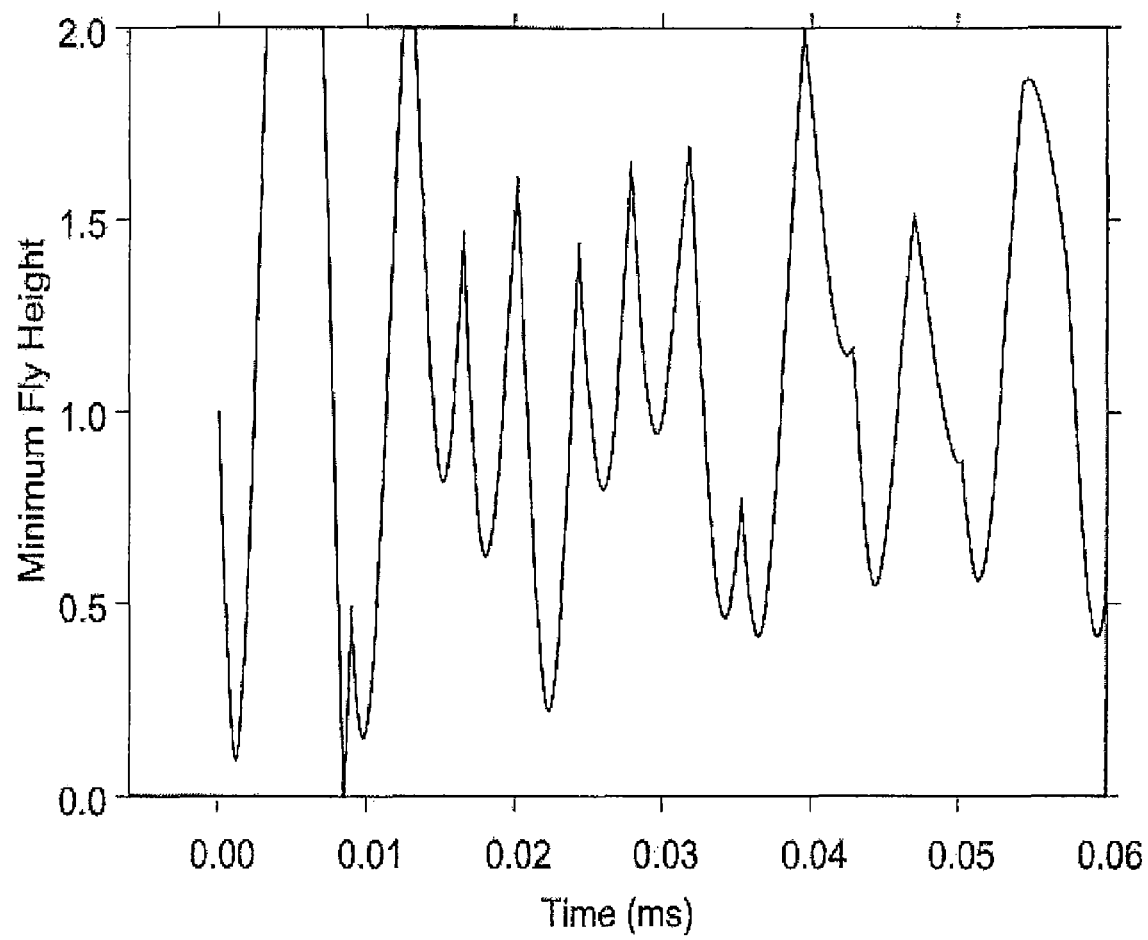
FIG. 11 illustrates a flying height response of a reference slider on a hard disk.

As a point of reference, the performance of the pico slider air bearing interface of a HDD when subjected to mechanical shock will be described. The reference slider air bearing configuration will be identical with that of the previous example except that neither of the trailing pads are uniformly etched and no TPCs are present. Thus, the four pads are co-planer with widths of 152 μm (0.006 in), and the two leading edge pads have step inlets. The disk diameter and speed, as well as the slider location and orientation, remain the same. The slider, initially in static flying equilibrium, is subjected to a mechanical shock (vertical impulse) at the slider center of mass toward the disk. The impulse magnitude is sufficient to impart to the slider an initial velocity of 2.54 cm/s (1 in/s) toward the disk. The air film cannot absorb the energy of the shock without contact occurring between slider and disk. The dynamic fly height response is shown in FIG. 11 and presents the instantaneous minimum fly height as a function of time. Following the shock, the first approach to the disk produces an absolute minimum fly height of 0.09 (dimensionless, from initial value of unity). After rebound, the second approach produces a severe contact/impact condition. The cusp-like response shown in FIG. 11 is due to the fact that the minimum fly height changes location as the slider experiences rapid changes in pitch, roll, and translation due to the shock. Contact conditions in a HDD during operation can cause damage to both slider and disk as well as loss of recorded data. Results such as this illustrate why the HDD is not ideally suited for use in mobile and portable storage products.

Figure 12:
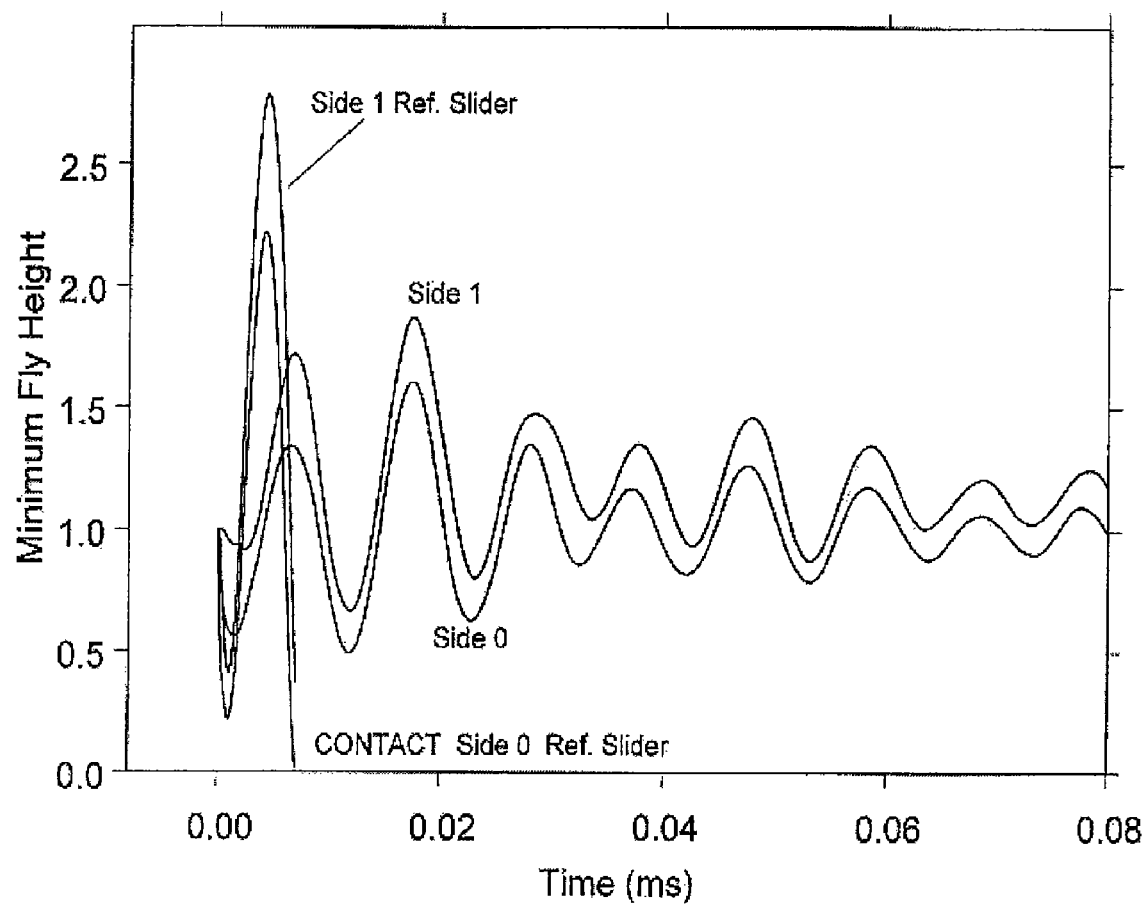
FIG. 12 illustrates a comparison of the etched rear pad slider of FIG. 2A and a reference slider flying height response, where the inner diameter, skew angle=−8.5 deg.
Figure 13:
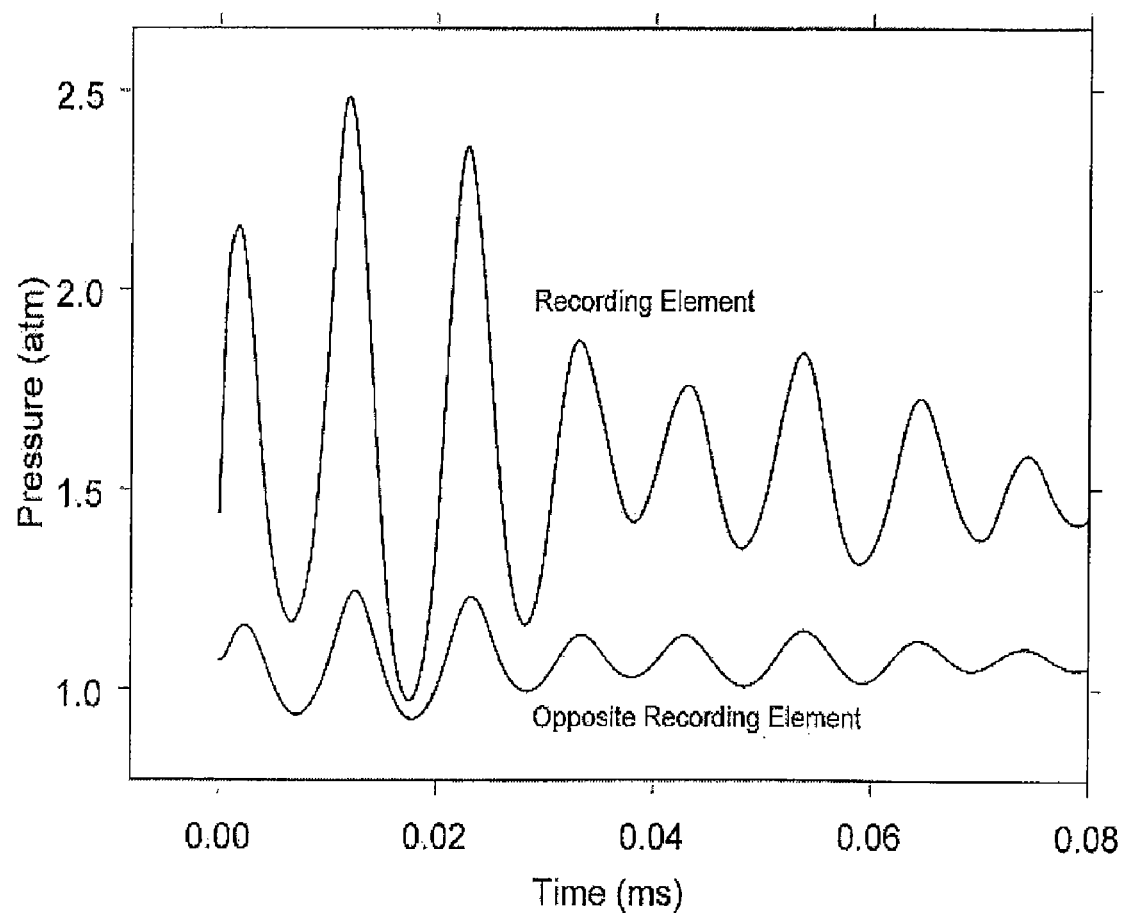
FIG. 13 illustrates a pressure response at the recording element of the slider of FIG. 2A, with the inner diameter, skew angle=−8.5 deg.

Last, the shock performance of the new slider arrangement will be compared with that of the reference slider described above, when both slider arrangements fly at the inner recording track (skew=−8.5 degrees) of a metal foil disk spinning at 4500 rpm. The air bearing surface of the new slider is the same as the earlier analyzed example. Each slider arrangement is subjected to an initial mechanical shock at the side 0 slider center of gravity, corresponding to an initial velocity of 2.54 cm/s (1 in/s) toward the disk. The minimum fly height response of the two slider arrangements is shown in FIG. 12. The reference slider arrangement survives the first approach toward the disk without contact. However, the high initial shock energy absorbed by the side 0 air film causes the subsequent motion to be of such high velocity that contact/impact occurs on the second approach. This is primarily due to the opposing air films being of equal stiffness, which restricts initial disk response to the shock. The FLEXTRAN code does not contain an impact model for the slider and flexible media, so simulation was terminated at the first prediction of impact. The fly height response of the new slider easily avoids contact, with the point of closest approach being about 50% of the initial minimum fly height value. The effect of viscosity related energy dissipation on the elevated TPC surfaces due to high frequency oscillation following the shock causes subsequent motion to dampen, and as seen in FIG. 12, the sliders begin to approach their initial steady-state flying height and orientation. The air film pressure response of the new slider arrangement at the x-y location of the side 0 RE is shown on FIG. 13 for both sliders. The compression and expansion of the stiffer side 0 air film produces the larger amplitude pressure fluctuations that act on the metal foil disk. Asymmetry of the pressure loading on the disk causes it to dynamically deflect at a nanometer level sufficient for the air bearing interface to survive the shock without contact.

Figure 14:
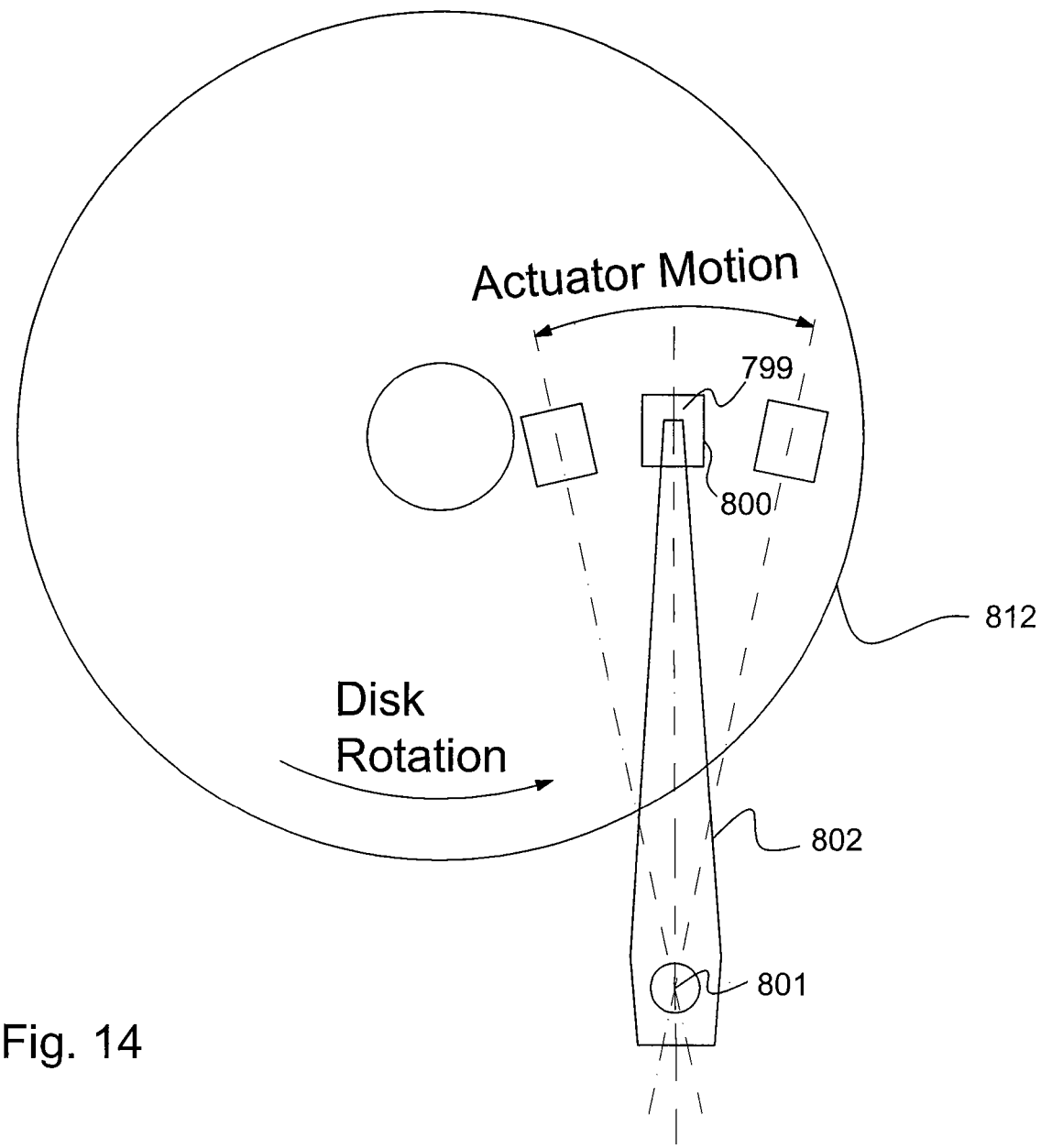
FIG. 14 is a top view of a slider arrangement showing gimbal mountings.

Referring now to FIG. 14, an overall system using a pair of sliders will be described. In so doing, it will be appreciated that the system of FIG. 14 may utilize any of the slider designs described herein. FIG. 14 illustrates a top view of the system. The side 799 of each slider 800 that faces away from the disk 812 is attached to a gimbal (not shown), and each gimbal is further attached to a load beam (also called a flexure). Each load beam is coupled to an actuator arm 802. The actuator arm 802 positions the slider 800 over the data surface of the disk 812. When a rotary actuator is used to locate the slider, the relative slider position is as shown on FIG. 14 with the center of actuator rotation at location 801. The combined load beam and actuator arm is represented schematically by 802.

CONCLUSIONS

Even with a very thin disk substrate thickness, a metal foil disk is substantially stiffer than the Mylar disk used in current data storage products due to the wide differences in elastic modulus between metals and Mylar. The relative stiffness of a metal foil disk together with the trend toward smaller recording head sliders causes the metallic disk to have very little static flexibility over the air bearing surface, regardless of the slider configuration. Thus, the metal foil disk static flexibility is not expected to be a useful property for the creation of asymmetrical opposed air bearing properties. However, an asymmetric opposed air bearing (thin and stiff air film at the recording element opposed by a thick and less stiff air film) may be created in a different way with a metal foil disk to provide improved dynamic properties at the slider/disk interface. By etching the air bearing pad opposite the recording element pad to a sufficient depth, the opposing side static flying height may be increased and the air film stiffness decreased to desired levels. The asymmetric combination of air bearing properties thus provides an enhanced dynamic flexibility to the metal foil disk when it is subjected to mechanical shock. This allows the air bearing slider/disk interface to avoid contact and impact when subjected to substantial levels of mechanical shock, reducing the likelihood of wear and damage to the interface. Based on these results, the metal foil disk may also find use as storage medium candidate for mobile and portable data storage applications where a shock environment is common.

Implementation of the asymmetric opposed air bearing requires sufficient static stiffness from the metal foil disk (unlike the static flexibility required in White, J., 2005, "Slider Air Bearing Design Enhancements for High Speed Flexible Disk Recording," ASME *Journal of Tribology*, 127, pp. 522-529 for a Mylar disk, previously incorporated by reference). And improved response to mechanical shock requires adequate dynamic flexibility of the metal foil disk as the two opposing air bearings with different stiffness values compete to contain the disk dynamic motion. Improper selection of a disk thickness for a given disk material may result in an unacceptable level of either metal foil disk static stiffness or dynamic flexibility.

The example described herein is based on an industry standard picosized (sometimes called 30%) slider flying on a 3.5 inch disk rotating at 4500 rpm. However, there are trends in the data storage industry toward smaller disk drives and components (sliders, disks, etc.) as applications become more mobile and portable. The invention described herein is not limited by slider size (such as industry standard 50%, 30%, 20%, etc., sized sliders) and is equally applicable over a range of disk speeds and disk sizes (such as 3.5, 2.5, 1.8, 1.0, 0.85 inch, etc.). The figures and examples described herein utilize a disk whose substrate material is nickel and whose thickness is 25.4 µm (0.001 in). However, the invention described herein is not limited to these values. Other metals may be used for the disk substrate and other disk thickness values may be used in order to achieve the described benefits of the invention. The invention is applicable for use with both linear and rotary actuators.

The invention has now been described in details for purposes of clarity and understanding. However, it will be appreciated that certain changes and modifications may be practiced within the scope of the appended claims.

NOMENCLATURE

A=air film surface area
c=disk damping coefficient
$(C_z, C_\alpha, C_\beta)$=slider damping coefficients
D=disk stiffness
F=slider preload force
g=gravitational constant
h=air film clearance
$(I_\alpha, I_\beta)$=slider moments of inertia
$(K_z, K_\alpha, K_\beta)$=slider mechanical spring coefficients
m=slider mass
$(M_\alpha, M_\beta)$=slider external moments
p=air film pressure
$p_a$=ambient pressure
(x,y)=slider and disk coordinates
$(x_{cg}, y_{cg}, z_{cg})$=slider center of gravity coordinates
$(x_p, y_p)$=slider preload coordinates
t=time
u=disk deflection
$(V_x, V_y)$=disk velocity components
Z=direction normal to plane of disk
$(\alpha, \beta)$=slider rotational degrees of freedom
$\delta$=disk thickness
$\lambda_a$=ambient air mean free path
$\mu$=air film viscosity
$\rho$=disk mass density
$(\sigma_{xx}, \sigma_{yy}, \sigma_{xy})$=disk midsurface stress components

What is claimed is:

1. A slider arrangement for supporting a recording element in operative relation to a flexible moving recording medium comprising:
   a first slider having a first face positioned toward a first side of the recording medium, said first face having a leading edge, a trailing edge and two side edges relative to the motion of said recording medium, and a longitudinal axis disposed along its length, said longitudinal axis being at a non-zero skew angle with respect to the direction of motion of said recording medium, said first face comprising a plurality of air bearing surfaces at least some of which whose shape and depth are formed by etching; wherein one of the plurality of air bearing surfaces of the first face defines an air bearing surface A that is located in the vicinity of the trailing edge of the first face and a recording element is mounted in surface A; and wherein the plurality of air bearing surfaces of the first face includes two air bearing surfaces that do not extend to the vicinity of the trailing edge of the first face and wherein these two air bearing surfaces each have a depth that is unetched and are positioned within the same plane to define an unetched reference plane one, and wherein the recording element is located substantially in unetched reference plane one;
   a second slider having a second face positioned toward a second side of the recording medium, said second face having a leading edge, a trailing edge and two side edges relative to the motion of said recording medium, and a longitudinal axis disposed along its length, said longitudinal axis being at a non-zero skew angle with respect to the direction of motion of said recording medium, said second face comprising a plurality of air bearing surfaces at least some of which whose shape and depth are formed by etching; wherein one of the plurality of air bearing surfaces of the second face defines an air bearing surface B, wherein at least a portion of surface B is carried in the vicinity of the trailing edge of the second face; and wherein the plurality of air bearing surfaces of the second face includes two air bearing surfaces that do not extend to the vicinity of the trailing edge of the second face, and wherein these two air bearing surfaces each have a depth that is unetched and are positioned within the same plane to define an unetched reference plane two;

a first mounting device to mount the first slider relative to the first side of the recording medium substantially opposite the second slider in a biased manner toward the recording medium; and a second mounting device to mount the second slider relative to the second side of the recording medium substantially opposite the first slider in a biased manner toward the recording medium, and wherein surface A is located in such a way that the recording element is directly opposite a portion of surface B; and wherein the flexible recording medium comprises a metallic substrate and at least one layer of magnetic material such that the thickness of the flexible recording medium is less than about 0.005 inch, and wherein in the vicinity of the recording element, surface B has an etch depth B relative to the unetched reference plane two, so that during operation the flying height at the recording element is less than the thickness of the directly opposing air film of surface B.

2. A slider arrangement as in claim 1, wherein surface A has an etch depth A relative to the first reference plane, such that depth B is greater than depth A.

3. A slider arrangement as in claim 1, wherein at least one of the air bearing surfaces carried by the first face is provided with a transverse pressure contour (TPC) along at least one of its side edges for providing increased flying height control to first slider, said TPC having at least an approximate step geometry provided by an etching process, wherein the TPC has a height H and width L to establish a ratio H/L of about 0.001 to about 0.10; wherein said TPC has a length that occupies at least a partial length of the air bearing surface side edge of its location, has a width L that may vary along its length, and has a height H that may vary along its length.

4. A slider arrangement as in claim 3, wherein the TPC occupies the full length of the air bearing surface side edge of its location.

5. A slider arrangement as in claim 3, wherein the width L is constant along its length, and the height H is constant along its length.

6. A slider arrangement as in claim 1, wherein the first face and the second face each contain a vacuum cavity for creation of a subambient pressure.

7. A slider arrangement as in claim 1, wherein said slider arrangement is included in a magnetic recording system.

8. A slider arrangement as in claim 1, wherein the recording medium substrate is selected from a group of substrates consisting of steel, stainless steel, nickel, nickel alloys, titanium and titanium alloys.

9. A slider arrangement as in claim 1, wherein the thickness of the flexible recording medium is between 0.0005 inch and 0.003 inch.

10. A slider arrangement for supporting a recording element in operative relation to a flexible moving recording medium comprising:

a first slider having a first face positioned toward a first side of the recording medium, said first face containing a plurality of air bearing surfaces, including an air bearing surface A and an air bearing surface B, wherein one of the air bearing surfaces defines an unetched plane, said first face further having a leading edge, a trailing edge and two side edges relative to the motion of said recording medium, and a longitudinal axis disposed along its length, said longitudinal axis being at a non-zero skew angle with respect to the direction of motion of said recording medium; wherein a first recording element is mounted in surface A and is located in the vicinity of the trailing edge of the first face, and wherein at least a portion of surface B is located in the vicinity of the trailing edge of the first face;

a second slider having a second face positioned toward a second side of the recording medium, said second face containing a plurality of air bearing surfaces, including an air bearing surface C and an air bearing surface D, wherein one of the air bearing surfaces defines an unetched plane, said second face further having a leading edge, a trailing edge and two side edges relative to the motion of said recording medium, and a longitudinal axis disposed along its length, said longitudinal axis being at a non-zero skew angle with respect to the direction of motion of said recording medium; wherein a second recording element is mounted in surface C and is located in the vicinity of the trailing edge of the second face, and wherein at least a portion of surface D is carried in the vicinity of the trailing edge of the second face;

a first mounting device to mount the first slider relative to the first side of the recording medium substantially opposite the second slider in a biased manner toward the recording medium; and a second mounting device to mount the second slider relative to the second side of the recording medium substantially opposite the first slider in a biased manner toward the recording medium, and wherein surface A is located in such a way that the first recording element is directly opposite a portion of surface D; and wherein surface C is located in such a way that the second recording element is directly opposite a portion of surface B; and wherein the flexible recording medium comprises a metallic substrate and at least one layer of magnetic material such that the thickness of the flexible recording medium is less than about 0.005 inch, and wherein in the vicinity of the first recording element, surface D has a depth greater than that of surface A relative to their respective unetched planes, and wherein in the vicinity of the second recording element, surface B has a depth greater than that of surface C relative to their respective unetched planes, so that during operation the flying height at each said recording element is less than the thickness of a directly opposing respective air film.

11. A slider arrangement as in claim 10, wherein the air bearing surfaces A, B, C and D are formed by etching.

12. A slider arrangement as in claim 10, wherein at least one of the air bearing surfaces carried by the first face is provided with a transverse pressure contour (TPC) along at least one of its side edges for providing increased flying height control to first slider, said TPC having at least an approximate step geometry provided by an etching process, wherein the TPC has a height H and width L to establish a ratio H/L of about 0.001 to about 0.10; wherein said TPC has a length that occupies at least a partial length of the air bearing surface side edge of its location, has a width L that may vary along its length, and has a height H that may vary along its length.

13. A slider arrangement as in claim 12, wherein the TPC occupies the full length of the side edge of its air bearing surface.

14. A slider arrangement as in claim 12, wherein the width L is constant along its length, and the height H is constant along its length.

15. A slider arrangement as in claim 10, wherein the recording medium substrate is selected from a group of substrates consisting of steel, stainless steel, nickel, nickel alloys, titanium and titanium alloys.

16. A slider arrangement as in claim 10, wherein the thickness of the flexible recording medium is between 0.0005 inch and 0.003 inch.

17. A slider arrangement as in claim 10, wherein said slider arrangement is included in a magnetic recording system.

18. A slider arrangement for supporting a recording element in operative relation to a flexible moving recording medium comprising:
   a first slider having a first face positioned toward a first side of the recording medium, said first face containing a plurality of air bearing surfaces, including an air bearing surface A and an air bearing surface B that are formed by etching, wherein one of the air bearing surfaces defines an unetched plane, said first face further having a leading edge, a trailing edge and two side edges relative to the motion of said recording medium, and a longitudinal axis disposed along its length, said longitudinal axis being at a non-zero skew angle with respect to the direction of motion of said recording medium; wherein a first recording element is mounted in surface A and is located in the vicinity of the trailing edge of the first face, and wherein at least a portion of surface B is located in the vicinity of the trailing edge of the first face;
   wherein at least one air bearing surface carried by the first face is provided with a transverse pressure contour (TPC) along at least one of its side edges for providing increased flying height control to first slider, said TPC having a step or approximate step geometry provided by an etching process and has a height H and width L to establish a ratio H/L of about 0.001 to about 0.10; wherein said TPC has a length that occupies at least a partial length of the air bearing surface side edge of its location, wherein the width L may vary along its length, and the height H may vary along its length;
   a second slider having a second face positioned toward a second side of the recording medium, said second face containing a plurality of air bearing surfaces, including an air bearing surface C and an air bearing surface D that are formed by etching, wherein one of the air bearing surfaces defines an unetched plane, said second face further having a leading edge, a trailing edge and two side edges relative to the motion of said recording medium, and a longitudinal axis disposed along its length, said longitudinal axis being at a non-zero skew angle with respect to the direction of motion of said recording medium; wherein a second recording element is mounted in surface C and is located in the vicinity of the trailing edge of the second face, and wherein at least a portion of surface D is carried in the vicinity of the trailing edge of the second face;
   a first mounting device to mount the first slider relative to the first side of the recording medium substantially opposite the second slider in a biased manner toward the recording medium; and a second mounting device to mount the second slider relative to the second side of the recording medium substantially opposite the first slider in a biased manner toward the recording medium, and wherein surface A is located in such a way that the first recording element is directly opposite a portion of surface D; and wherein surface C is located in such a way that the second recording element is directly opposite a portion of surface B;
   wherein the flexible recording medium comprises a metallic substrate and at least one layer of magnetic-material such that the thickness of the flexible recording medium is less than about 0.005 inch, and wherein at least a portion of surface D is etched to a depth greater than that of surface A relative to their respective unetched planes and in the vicinity of the first recording element, and wherein at least a portion of surface B is etched to a depth greater than that of surface C relative to their respective unetched planes and in the vicinity of the second recording element, so that during operation the flying height at each said recording element is less than the thickness of the directly opposing respective air film.

19. A slider arrangement as in claim 18, wherein the TPC occupies the full length of the side edge of the first or second air bearing surface.

20. A slider arrangement as in claim 18, wherein the width L varies along its length, and the height H varies along its length.

21. A slider arrangement as in claim 18, wherein said slider arrangement is included in a magnetic recording system.

* * * * *